US012632117B2

(12) United States Patent
Rao et al.

(10) Patent No.: US 12,632,117 B2
(45) Date of Patent: May 19, 2026

(54) GESTURE RECOGNITION ON RESOURCE-CONSTRAINED DEVICES

(71) Applicant: SONY GROUP CORPORATION, Tokyo (JP)

(72) Inventors: Krishna Prasad Agara Venkatesha Rao, Bangalore (IN); Srinidhi Srinivasa, Bangalore (IN); Akshay Shekhar Kadakol, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 863 days.

(21) Appl. No.: 17/710,888

(22) Filed: Mar. 31, 2022

(65) Prior Publication Data

US 2023/0315209 A1    Oct. 5, 2023

(51) Int. Cl.
*G06F 3/01*          (2006.01)
*G06V 10/774*       (2022.01)
(Continued)

(52) U.S. Cl.
CPC .......... *G06F 3/017* (2013.01); *G06V 10/7747* (2022.01); *G06V 10/82* (2022.01); *H04L 67/04* (2013.01)

(58) Field of Classification Search
CPC .... G06F 3/017; G06V 10/7747; G06V 10/82; G06V 40/28; H04L 67/04; H04N 21/44004
See application file for complete search history.

(56) References Cited

U.S. PATENT DOCUMENTS

| 10,521,264 B2 * | 12/2019 | Chandler | .................. G06F 3/16 |
| 11,055,521 B2 * | 7/2021 | Chandler | .............. G06V 40/28 |

(Continued)

FOREIGN PATENT DOCUMENTS

| CN | 108292362 A | 7/2018 | |
| EP | 4387244 A1 * | 6/2024 | ............... G06F 3/01 |

OTHER PUBLICATIONS

Mujahid, et al., "Real-Time Hand Gesture Recognition Based on Deep Learning YOLOv3 Model", Applied Sciences, Multidisciplinary Digital Publishing Institute (MDPI), vol. 11, No. 9, May 2, 2021, 15 pages.

(Continued)

*Primary Examiner* — Gregory A Morse
*Assistant Examiner* — Renae A Bitor
(74) *Attorney, Agent, or Firm* — CHIP LAW GROUP

(57) ABSTRACT

An electronic device for gesture recognition on resource-constrained devices is provided. The electronic device controls storage of a plurality of first consecutive image frames in a first buffer of a first length. The plurality of first consecutive image frames corresponds to the first length. The electronic device recognizes a first hand sign of a plurality of hand signs in a first subset of image frames of the plurality of first consecutive image frames. The electronic device controls storage of the recognized first hand sign in a second buffer of a second length based on the determination that a ratio of a number of the first subset of image frames and the first length is one of equal to or greater than the threshold. The electronic device determines a gesture corresponding to one or more hand signs of the plurality of hand signs stored in the second buffer.

18 Claims, 10 Drawing Sheets

(51) Int. Cl.
G06V 10/82 (2022.01)
H04L 67/04 (2022.01)

(56) References Cited

U.S. PATENT DOCUMENTS

| | | | | |
|---|---|---|---|---|
| 2011/0301934 A1* | 12/2011 | Tardif | ..................... | G06F 40/45 |
| | | | | 382/103 |
| 2015/0146920 A1 | 5/2015 | Mazurenko | | |
| 2017/0192515 A1* | 7/2017 | Menadeva | .......... | G06F 3/04812 |
| 2021/0333884 A1* | 10/2021 | Li | ............................. | G06T 7/70 |
| 2023/0252821 A1* | 8/2023 | Jia | .......................... | G06V 40/16 |
| | | | | 382/181 |

OTHER PUBLICATIONS

Mohammed, et al., "A Deep Learning-Based End-to-End Composite System for Hand Detection and Gesture Recognition", Sensors, Researchgate, vol. 19, No. 23, Nov. 30, 2019, 23 pages.
Yu, et al., "An Efficient and Lightweight Convolutional Neural Network for Remote Sensing Image Scene Classification", Sensors, Multidisciplinary Digital Publishing Institute, vol. 20, No. 7, 1999, pp. 1-25.
Xie, et al., "LE-HGR: A Lightweight and Efficient RGB-Based Online Gesture Recognition Network for Embedded AR Devices", IEEE, International Symposium on Mixed and Augmented Reality Adjunct (ISMAR-Adjunct), Oct. 10-18, 2019.

* cited by examiner

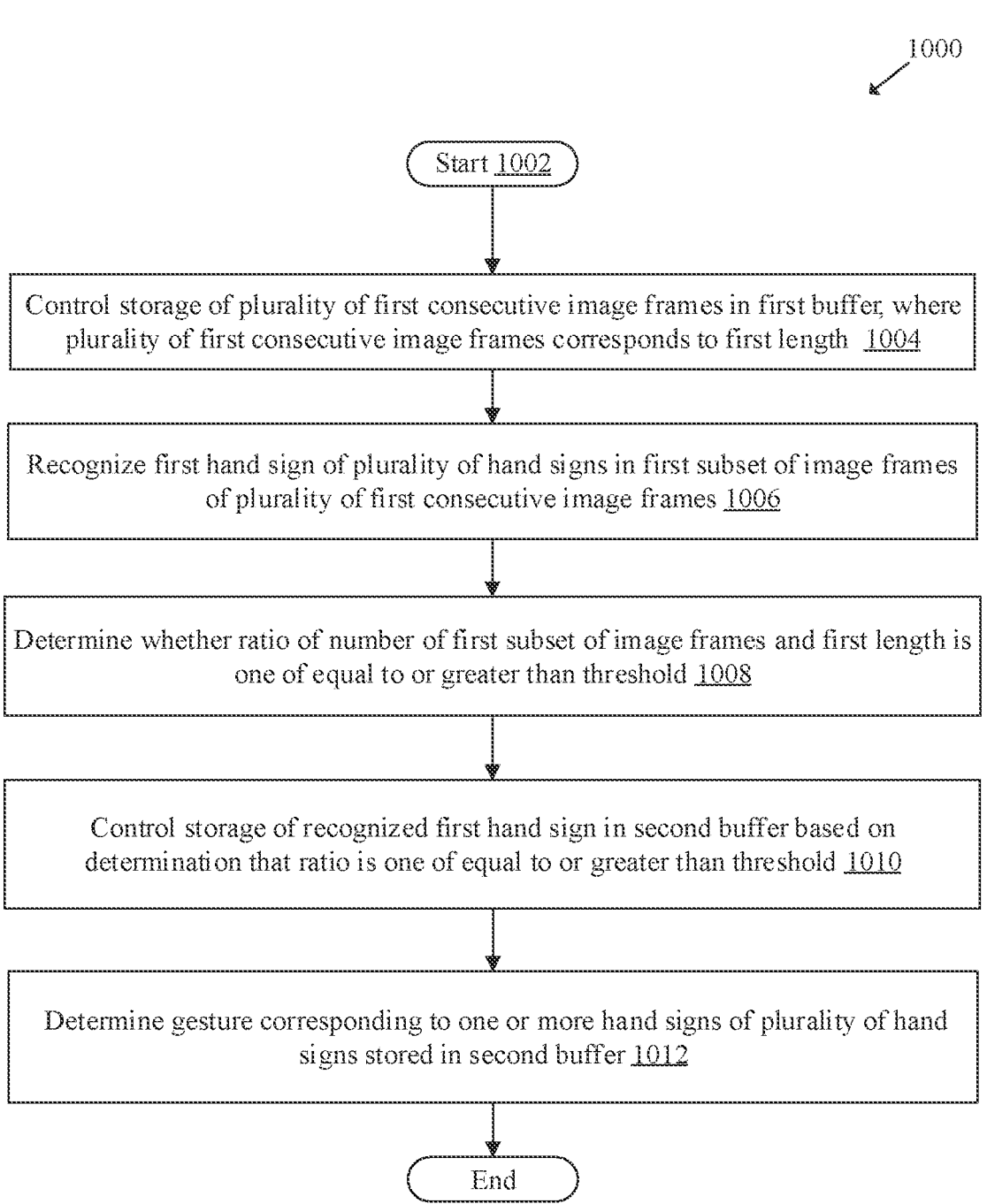

1000

Start 1002

Control storage of plurality of first consecutive image frames in first buffer, where plurality of first consecutive image frames corresponds to first length 1004

Recognize first hand sign of plurality of hand signs in first subset of image frames of plurality of first consecutive image frames 1006

Determine whether ratio of number of first subset of image frames and first length is one of equal to or greater than threshold 1008

Control storage of recognized first hand sign in second buffer based on determination that ratio is one of equal to or greater than threshold 1010

Determine gesture corresponding to one or more hand signs of plurality of hand signs stored in second buffer 1012

End

FIG. 10

GESTURE RECOGNITION ON RESOURCE-CONSTRAINED DEVICES

CROSS-REFERENCE TO RELATED APPLICATIONS/INCORPORATION BY REFERENCE

None.

FIELD

Various embodiments of the disclosure relate to image processing. More specifically, various embodiments of the disclosure relate to an electronic device and method for gesture recognition on resource-constrained devices.

BACKGROUND

Advancements in the fields of image processing and machine learning have provided various techniques by which videos and images may be processed for gesture recognition. Gesture recognition may be a computationally intensive task, because it requires processing of content across multiple frames of video. Existing techniques for gesture recognition may employ machine learning (ML) models (such as, recurrent neural networks (RNNs)) for processing content across multiple frames. These RNN models may be based on gated recurrent unit (GRU) or long-short term memory (LSTM), which are significantly large in size due to the number of parameters involved, and thus may have huge memory requirements. Since the RNN models have huge memory requirements, it may not be practically feasible to deploy these models on resource-constrained devices (such as user devices with limited memory) owing to the latency in processing computationally intensive tasks. Due to memory constraints of the resource-constrained devices, the processing time required for execution of the computationally intensive task (e.g. gesture recognition) may be prohibitively high to cater to real-time applications. Therefore, the deployment of RNN models on resource-constrained devices may be challenging.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for gesture recognition on resource-constrained devices, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 10 is a flowchart that illustrates exemplary operations for gesture recognition on resource-constrained devices, in accordance with an embodiment of the disclosure.

DETAILED DESCRIPTION

Figure 1:
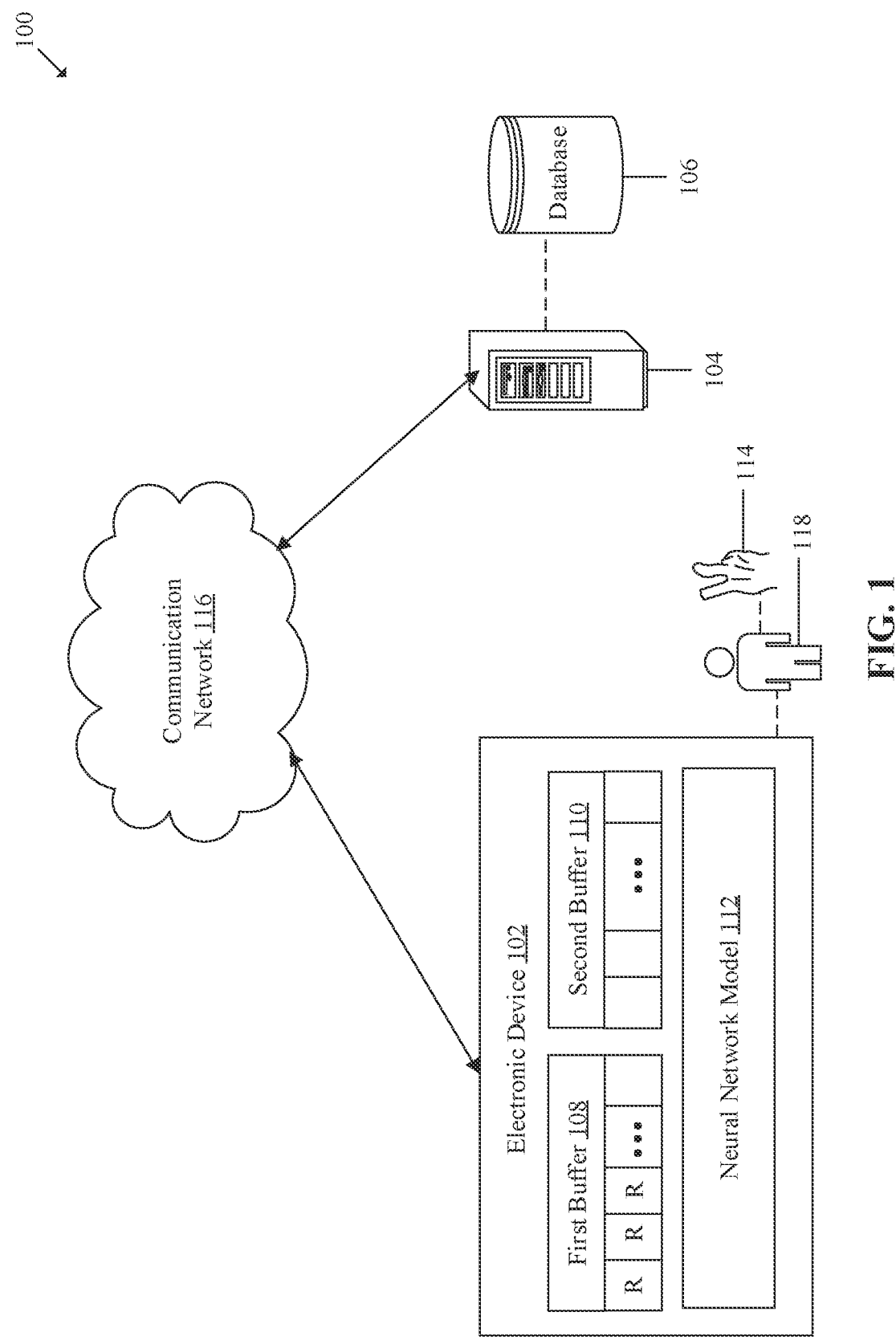
FIG. 1 is a diagram that illustrates an exemplary network environment for gesture recognition on resource-constrained devices, in accordance with an embodiment of the disclosure.

The following described implementations may be found in the disclosed electronic device and method for gesture recognition on resource-constrained devices. Exemplary aspects of the disclosure provide an electronic device. The electronic device may include a memory that comprises a first buffer (e.g. a ring buffer) of a first length and a second buffer of a second length. The first length of the first buffer and the second length of the second buffer may be configurable. The electronic device may control storage of a plurality of first consecutive image frames in the first buffer. The plurality of first consecutive image frames may correspond to the first length. The electronic device may recognize a first hand sign of a plurality of hand signs in a first subset of image frames of the plurality of first consecutive image frames. The electronic device may determine whether a ratio of a number of the first subset of image frames and the first length is one of equal to or greater than a threshold. The ratio may indicate a frequency of occurrence of the first hand sign in the plurality of first consecutive image frames. The electronic device may control storage of the recognized first hand sign in the second buffer based on the determination that the ratio is one of equal to or greater than the threshold. The electronic device may determine a gesture corresponding to one or more hand signs of the plurality of hand signs stored in the second buffer. The plurality of hand signs may correspond to the second length.

The electronic device may be further configured to discard the recognized first hand sign based on the determination that the ratio is less than the threshold. The electronic device may be thereby suppress noise in gesture recognition by discarding a hand sign in the case where the ratio of the number of image frames in which the hand sign is recognized and the first length of the first buffer is less than the threshold, and by retaining the hand sign in the second buffer for determination of the gesture in the case where the ratio is equal to or greater than the threshold.

The electronic device may be further configured to apply a neural network model to detect an object corresponding to the first hand sign in the first subset of image frames. In an embodiment, a size of the neural network model may satisfy a memory constraint associated with the electronic device. For example, the memory constraint of the electronic device may require the neural network model to be less than a threshold size (e.g. 100 kilobytes). The neural network model may be optimized to reduce the size of the neural network model to satisfy the memory constraint of the electronic device. The neural network model may be a lightweight model that includes one of a first neural network model (e.g. an object detection model) or a second neural network model (e.g. a classification model). In another embodiment, the electronic device may apply a second neural network model for execution of image classification on the plurality of first consecutive image frames. Based on the buffer-based noise suppression, the electronic device may improve accuracy of the gesture recognition performed by neural network models that are optimized for low memory footprint and low processing power. Based on the improvement in the accuracy of the neural network models, the electronic device may thereby enable the possibility of employing such simple and optimized neural network models, which may not be inherently robust to noise, for gesture recognition on resource-constrained devices.

In an example, the gesture may include at least two hand signs (e.g. transition from open palm to closed palm). The electronic device may control storage of a plurality of second consecutive image frames in the first buffer. The plurality of second consecutive image frames may be stored in the first buffer subsequent to the plurality of first consecutive image frames. The electronic device may recognize a second hand sign of the plurality of hand signs in the first subset of image frames of the plurality of second consecutive image frames. The electronic device may determine whether the ratio of the number of the first subset of image frames corresponding to the second hand sign and the first length is one of equal to or greater than the threshold. The electronic device may control storage of the recognized second hand sign in the second buffer based on the determination that the ratio is one of equal to or greater than the threshold. The electronic device may determine the gesture corresponding to at least two hand signs of the plurality of hand signs stored in the second buffer.

In an example, the gesture may include a single hand sign and a motion of the hand sign. The electronic device may be configured to receive a plurality of image frames. The plurality of image frames may include the plurality of first consecutive image frames. The electronic device may determine a bounding box that encloses the detected object (corresponding to the hand sign) in each image frame of the plurality of image frames. The bounding box may correspond to a set of coordinates in a respective image frame of the plurality of image frames. The electronic device may track the bounding box across a threshold number of image frames of the plurality of image frames to estimate a motion of the detected object. The electronic device may further set one of a plurality of quadrants or a plurality of grids associated with each image frame of the plurality of image frames. The electronic device may track the motion of the detected object across the one of the plurality of quadrants or the plurality of grids. The electronic device may determine the gesture based on the tracked motion of the detected object.

In an embodiment, the electronic device may suppress noise in the gesture recognition by eliminating outliers based on a strength of a signal corresponding to the recognized first hand sign and the second hand sign in the first buffer. The electronic device may determine a probability value corresponding to the recognition of the first hand sign in each of the plurality of first consecutive image frames in the first buffer. For example, the probability value may be a probability of prediction of a hand sign within the first buffer. The electronic device may determine a confidence score corresponding to the recognition of the first hand sign in each of the plurality of first consecutive image frames. For example, the confidence score may be output by the first neural network model or the second neural network model. The electronic device may determine a first strength corresponding to the first hand sign based on the probability value corresponding to the first hand sign and the confidence score. The electronic device may compare the first strength corresponding to the first hand sign with a second strength corresponding to each of the plurality of hand signs excluding the first hand sign. The electronic device may determine the gesture corresponding to the first hand sign in a case where the first strength is greater than the second strength. The electronic device may retain the first hand sign and discard the hand signs (e.g. outliers) other than the first hand sign for the determination of the gesture. The electronic device may thereby suppress noise in the gesture recognition by eliminating outliers based on the strength of the signal corresponding to the recognized hand sign in the first buffer, and may thereby enable accurate gesture recognition by optimized neural network models whose single frame accuracy may be reduced due to resource optimization.

FIG. 1 is a diagram that illustrates an exemplary network environment for gesture recognition on resource-constrained devices, in accordance with an embodiment of the disclosure. With reference to FIG. 1, there is shown a network environment 100. In the network environment 100, there are shown an electronic device 102 and a server 104. The server 104 may include a database 106. The electronic device 102 may include a first buffer 108, a second buffer 110, and a neural network (NN) model 112. The first buffer 108 may be of a first length and the second buffer 110 may be of a second length. The first length and the second length may be configurable by the electronic device 102. The electronic device 102 may be associated with a user 118. In the network environment 100, there is further shown a communication network 116 through which the electronic device 102 and the server 104 may communicate with each other.

The electronic device 102 may include suitable logic, circuitry, interfaces, and/or code that may be configured to control storage of a plurality of first consecutive image frames in the first buffer 108, recognize a hand sign (for example, closed palm 114) of the user 118 in a first subset of image frames of the plurality of first consecutive image frames, control storage of the recognized first hand sign in the second buffer 110 based on determination that a ratio of a number of the first subset of image frames and the first length is one of equal to or greater than a threshold, and determine a gesture corresponding to one or more hand signs of the plurality of hand signs stored in the second buffer 110. Examples of the electronic device 102 may include, but are not limited to, a computing device, a desktop, a personal computer, a laptop, a computer workstation, a display monitor or a computer monitor, a tablet, a smartphone, a cellular phone, a mobile phone, a consumer electronic (CE) device having a display, a television (TV), a head mounted display, a digital signage, a camera, a digital mirror (or a smart mirror), or a smart wearable device (e.g. smart watch). In an embodiment, the electronic device 102 may be a resource-constrained device including a memory constraint. The neural network model 112 may be optimized for size reduction in order to satisfy the memory constraint of the electronic device 102, and may execute gesture recognition on the electronic device 102 in real time.

The server 104 may include suitable logic, circuitry, and interfaces, and/or code that may be configured to store a global copy of the neural network model 112. The server 104 may be configured to communicate with the electronic device 102 in a client-server model to make the neural network model 112 available for download, and to periodically update both the global copy and local copies of the neural network model 112. The server 104 may be configured to periodically receive diagnostic data regarding the performance of the neural network model 112 from the electronic device 102 based on user permissions on the electronic device 102. The server 104 may be configured to train the neural network model 112 based on a training dataset stored in the database 106. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server. In at least one embodiment, the server 104 may be implemented as a plurality of distributed cloud-based resources by use of several technologies that are well known to those ordinarily skilled in the art. A person of ordinary skill in the art will understand that the scope of the disclosure is not limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may be configured to store training dataset for the neural network model 112, including training images associated with hand signs and gestures. The database 106 may store object detection data and image classification data for the neural network model 112. In some embodiments, the server 104 or the electronic device 102 may retrieve the training images stored in the database 106 for construction of a training dataset. The server 104 or the electronic device 102 may train the neural network model 112 to recognize hand signs based on the training dataset. The electronic device 102 may retrieve the training images from the database 106 via the server 104. In some embodiments, the electronic device 102 may recognize a hand sign in an image frame, associate the recognized hand sign with the image frame, and store the image frame in association with the recognized hand sign in the database 106, via the server 104. The database 106 may be derived from data of a relational database, a non-relational database, or a set of comma-separated values (CSV) files in conventional or big-data storage. The database 106 may be stored or cached on a device, such as the server 104 or the electronic device 102. In some embodiments, the database 106 may be hosted on a plurality of servers stored at same or different locations.

The operations of the database 106 may be executed using hardware, including but not limited to, a processor, a microprocessor (e.g., to perform or control performance of one or more operations), a field-programmable gate array (FPGA), or an application-specific integrated circuit (ASIC). In some other instances, the database 106 may be implemented using a combination of hardware and software.

The first buffer 108 and the second buffer 110 may be a part of a memory (e.g. random access memory) of the electronic device 102. The first buffer 108 may be a ring buffer or a circular buffer, or may include any data structure suited for first in, first out method. The first buffer 108 may be configured to store a set of consecutive image frames received from an image capture device. In another embodiment, the first buffer 108 may be configured to store a set of frame numbers in association with recognized hand signs (e.g. labels). The second buffer 110 may store one or more hand signs, where each hand sign is recognized in a subset of image frames of the set of consecutive image frames. In an embodiment, the second buffer 110 may store information (e.g. a class label) corresponding to each hand sign. In an embodiment, the first length of the first buffer 108 and the second length of the second buffer 110 may be configurable. For example, the electronic device 102 may set the first length of the first buffer based on a frame rate of the image capture device. In another example, the electronic device 102 may set the second length of the second buffer based on one of a type of the gesture or a number of hand signs that constitute the gesture.

The neural network model 112 may be a classification model which may be trained to identify a categorical variable (e.g. object label, gesture label, etc.). In another embodiment, the neural network model 112 may be a regression model which may be trained to identify a relationship between inputs, such as features in a training dataset and output labels. In an embodiment, the neural network model 112 may be resource optimized to reduce the size of the neural network model 112 in order to satisfy the memory constraint associated with the electronic device 102. For example, the optimization of the neural network model 112 may include reduction of the number of intermediate layers of the neural network model 112, lower spatial resolution for input, compression of the neural network model 112 by quantization of values in the neural network model 112 or other compression techniques, employing a bottleneck layer for lower memory footprint and lower processing power, and so on. In accordance with an embodiment, the training dataset may include a set of objects corresponding to hand signs. In accordance with another embodiment, the training dataset may include a set of hand signs.

The neural network model 112 may be defined by its hyper-parameters, for example, number of weights, cost function, input size, number of layers, and the like. The hyper-parameters of the neural network model 112 may be tuned and weights may be updated to move towards a global minima of a cost function for the neural network model 112. After several epochs of the training on the feature information in the training dataset, the neural network model 112 may be trained to output a prediction result for a set of inputs. The prediction result may be indicative of a class label (for example, a hand sign or gesture) for each input of the set of inputs. For example, the neural network model 112 may be trained to predict hand signs in each of a plurality of consecutive input image frames.

The plurality of layers of the neural network model 112 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 112. Outputs of each hidden layer may be coupled to inputs of at least one node in other layers of the neural network model 112. Node(s) in the final layer may receive inputs from at least one hidden layer to output a result. The number of layers and the number of nodes in each layer may be determined from hyper-parameters of the neural network model 112. Such hyper-parameters may be set before, while training, or after training the neural network model 112 on a training dataset.

Each node of the neural network model 112 may correspond to a mathematical function (e.g. a sigmoid function or a rectified linear unit) with a set of parameters, tunable during training of the neural network model 112. The set of parameters may include, for example, a weight parameter, a regularization parameter, and the like. Each node may use the mathematical function to compute an output based on one or more inputs from nodes in other layer(s) (e.g. previous layer(s)) of the neural network model 112. All or some of the nodes of the neural network model 112 may correspond to the same or a different mathematical function.

In accordance with an embodiment, the electronic device 102 may train the neural network model 112 on a training dataset that includes a set of objects that may correspond to hand signs. The neural network model 112 may be trained on the training dataset to detect an object in a plurality of consecutive image frames and classify the detected object. In accordance with another embodiment, the electronic device 102 may train the neural network model 112 on a training dataset that includes a set of hand signs or gestures. The neural network model 112 may be trained on the training dataset to execute image classification on the plurality of consecutive image frames. The image classification may enable identification or recognition of the hand sign 114.

In training the neural network model 112, one or more parameters of each node of the neural network model 112 may be updated based on whether an output of the final layer for a given input (from the training dataset) matches a correct result based on a loss function for the neural network model 112. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The neural network model 112 may include electronic data, which may be implemented as, for example, a software component of an application executable on the electronic device 102. The neural network model 112 may rely on libraries, external scripts, or other logic/instructions for execution by a processing device, such as the electronic device 102. The neural network model 112 may include code and routines, which when executed a processor, enable a computing device, such as the electronic device 102 to detect one or more hand signs in each of a plurality of consecutive image frames. Additionally, or alternatively, the neural network model 112 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 112 may be implemented using a combination of hardware and software.

Examples of the neural network model 112 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the learning engine may include numerical computation techniques using data flow graphs. In certain embodiments, the neural network model 112 may be based on a hybrid architecture of multiple Deep Neural Networks (DNNs).

The communication network 116 may include a communication medium through which the electronic device 102 and the server 104 may communicate with each other. The communication network 116 may be a wired or wireless communication network. Examples of the communication network 116 may include, but are not limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive a plurality of consecutive image frames from an image capture device or a sensor associated with the electronic device 102. In another embodiment, the electronic device 102 may retrieve the plurality of image frames from a memory of the electronic device 102. In another embodiment, the electronic device 102 may retrieve the plurality of image frames based on an input received from the user 118. The input may be indicative of selection of the plurality of image frames. The electronic device 102 may trigger one or more operations to recognize a hand sign captured in the received plurality of image frames and determine a hand gesture based on one or more recognized hand signs.

The electronic device 102 may be configured to control storage of the plurality of first consecutive image frames in the first buffer 108. The plurality of first consecutive image frames may correspond to a first length of the first buffer 108. For example, the electronic device 102 may control storage of 15 consecutive image frames in the first buffer 108. In another example, the electronic device 102 may control storage of a set of frame numbers (e.g. 15 frame numbers) of the plurality of first consecutive image frames in association with recognized hand signs (e.g. labels) in the first buffer 108. The first buffer 108 may include a plurality of elements or blocks, where each block of the plurality of blocks may store one image frame of the plurality of first consecutive image frames. In a case where the first length of the first buffer 108 is set to 15 blocks, the electronic device 102 may store 15 consecutive image frames in the first buffer 108. The details of the control of the storage of the plurality of first consecutive image frames in the first buffer 108 are further described, for example, in FIGS. 3 and 4.

The electronic device 102 may be configured to recognize a first hand sign of a plurality of hand signs in the first subset of image frames of the plurality of first consecutive image frames. The neural network model 112 may be trained to recognize the first hand sign in the first subset of image frames. In accordance with an embodiment, the neural network model 112 may include an object detector. The object detector may be trained based on the training dataset to detect an object in each image frame of the of the plurality of first consecutive image frames and classify the detected object. The object detector may be configured to detect an object that corresponds to the first hand sign. In accordance with another embodiment, the neural network model 112 may include an image classifier. The neural network model 112 may execute image classification on the first subset of image frames to recognize the first hand sign. In an embodiment, the plurality of first consecutive image frames may comprise a second subset of image frames, different from the first subset of image frames, that corresponds to one of a transition noise, an unrecognized class, or a second hand sign.

The electronic device 102 may be configured to determine whether a ratio of a number of the first subset of image frames and the first length is one of equal to or greater than a threshold (e.g. ⅔ or 0.66). The ratio may indicate a frequency of occurrence of the first hand sign in the plurality of first consecutive image frames. The electronic device 102 may be further configured to control storage of the recognized first hand sign in the second buffer 110 based on the determination that the ratio is one of equal to or greater than the threshold. For example, the first hand sign may be a closed palm. The second hand sign may be an open palm. Based on the determination that the "open palm" is recognized in the first subset of image frames (e.g. 10 image frames) of the plurality of first consecutive image frames (e.g. 15 image frames), the electronic device 102 may determine that the ratio (¹⁰⁄₁₅) is equal to greater than the threshold (e.g. the ratio of ¹⁰⁄₁₅ is equal to or greater than 0.667). Based on the determination that the ratio is equal to or greater than the threshold, the electronic device 102 may control storage of the first hand sign (e.g. closed palm) in the second buffer 110. For example, the electronic device 102 may store the information (e.g. class label) associated with the first hand sign (e.g. closed palm) in the second buffer 110. Details of the control of the storage of the recognized first hand sign in the second buffer 110 are further described, for example, in FIG. 4.

The electronic device 102 may be further configured to determine a gesture corresponding to one or more hand signs of the plurality of hand signs stored in the second buffer 110. The plurality of hand signs may correspond to the second length (e.g. three blocks). For example, the electronic device 102 may determine the gesture corresponding to the "closed palm" hand sign stored in the second buffer 110. In another example, the electronic device 102 may determine the gesture corresponding to the "closed palm" hand sign in combination with other hand signs stored in the second buffer 110. In another example, the electronic device 102 may determine the gesture corresponding to the "closed palm" hand sign stored in the second buffer 110 in combination with a motion of the hand sign.

The electronic device 102 may be further configured to discard the recognized first hand sign based on the determination that the ratio is less than the threshold. Based on the determination that the "open palm" is recognized in the first subset of image frames (e.g. eight image frames) of the plurality of first consecutive image frames (e.g. 15 image frames), the electronic device 102 may determine that the ratio (⁸⁄₁₅) is less than the threshold. The electronic device 102 may be further configured to discard the recognized first hand sign (e.g. open palm). The electronic device 102 may be thereby suppress noise in gesture recognition by discarding a hand sign in the case where the ratio of the number of image frames in which the hand sign is recognized and the first length of the first buffer 108 is less than the threshold, and by retaining the hand sign in the second buffer 110 for the determination of the gesture in the case where the ratio is equal to or greater than the threshold.

The electronic device 102 may be further configured to apply the neural network model 112 to detect an object corresponding to the first hand sign in the first subset of image frames. In an embodiment, a size of the neural network model 112 may satisfy a memory constraint associated with the electronic device 102. For example, the memory constraint of the electronic device 102 may require the neural network model 112 to be less than a threshold size (e.g. 100 kilobytes). The neural network model 112 may be optimized to reduce the size of the neural network model 112 to satisfy the memory constraint of the electronic device 102. The neural network model 112 may be a lightweight model that includes one of a first neural network model (e.g. an object detection model) or a second neural network model (e.g. an image classification model). In another embodiment, the electronic device 102 may apply a second neural network model for execution of image classification on the plurality of first consecutive image frames. Based on the buffer-based noise suppression, the electronic device 102 may improve accuracy of the gesture recognition performed by the neural network model 112 that is optimized for low memory footprint and low processing power. Based on the improvement in the accuracy of the neural network model 112, the electronic device 102 may thereby enable the possibility of employing simple and optimized neural network models, which may not be inherently robust to noise, for gesture recognition on resource-constrained devices. The details of the object detection or image classification by the neural network model 112 are further described, for example, in FIG. 3.

In an example, the gesture may include at least two hand signs (e.g. transition from open palm to closed palm). The electronic device 102 may control storage of a plurality of second consecutive image frames in the first buffer 108. The plurality of second consecutive image frames may be stored in the first buffer 108 subsequent to the plurality of first consecutive image frames. The electronic device 102 may recognize a second hand sign of the plurality of hand signs in the first subset of image frames of the plurality of second consecutive image frames. The electronic device 102 may determine whether the ratio of the number of the first subset of image frames corresponding to the second hand sign and the first length is one of equal to or greater than the threshold. The electronic device 102 may control storage of the recognized second hand sign in the second buffer 110 based on the determination that the ratio is one of equal to or greater than the threshold. The electronic device 102 may determine the gesture corresponding to at least two hand signs of the plurality of hand signs stored in the second buffer 110. The details of the determination of the gesture corresponding to at least two hand signs are further described, for example, in FIG. 4.

In an example, the gesture may include a single hand sign and a motion of the hand sign. The electronic device 102 may be configured to receive a plurality of image frames. The plurality of image frames may include the plurality of first consecutive image frames. The electronic device 102 may determine a bounding box that encloses the detected object (corresponding to the hand sign) or a mask region for the detected object in each image frame of the plurality of image frames. The bounding box may correspond to a set of coordinates in a respective image frame of the plurality of image frames. The electronic device 102 may track the bounding box or the mask region across a threshold number of image frames of the plurality of image frames to estimate a motion of the detected object. The electronic device 102 may further set one of a plurality of quadrants or a plurality of grids associated with each image frame of the plurality of image frames. The electronic device 102 may track the motion of the detected object across the one of the plurality of quadrants or the plurality of grids. The electronic device 102 may determine the gesture based on the tracked motion of the detected object. The details of the determination of the gesture corresponding to the single hand sign and the motion of the hand sign are further described, for example, in FIGS. 5-8.

In an embodiment, the electronic device 102 may suppress noise in the gesture recognition by eliminating outliers based on a strength of a signal corresponding to the recognized first hand sign and the second hand sign in the first buffer 108. The electronic device 102 may determine a probability value corresponding to the recognition of the first hand sign in each of the plurality of first consecutive image frames in the first buffer 108. For example, the probability value may be a probability of prediction of a hand sign within the first buffer 108. The electronic device 102 may determine a confidence score corresponding to the recognition of the first hand sign in each of the plurality of first consecutive image frames. For example, the confidence score may be output by the neural network model 112. The electronic device 102 may determine a first strength corresponding to the first hand sign based on the probability value corresponding to the first hand sign and the confidence score. The electronic device 102 may compare the first strength corresponding to the first hand sign with a second strength corresponding to each of the plurality of hand signs excluding the first hand sign. The electronic device 102 may determine the gesture corresponding to the first hand sign in a case where the first strength is greater than the second strength. The electronic device 102 may retain the first hand sign and discard the hand signs (e.g. outliers) other than the first hand sign for the determination of the gesture. The electronic device 102 may thereby suppress noise in the gesture recognition by eliminating outliers based on the strength of the signal corresponding to the recognized hand sign in the first buffer 108, and may thereby enable accurate gesture recognition by optimized neural network models whose single frame accuracy may be reduced due to resource optimization. The details of the suppression of noise in the gesture recognition based on the strength of the signal corresponding to the recognized hand sign are further described, for example, in FIG. 9.

Figure 2:
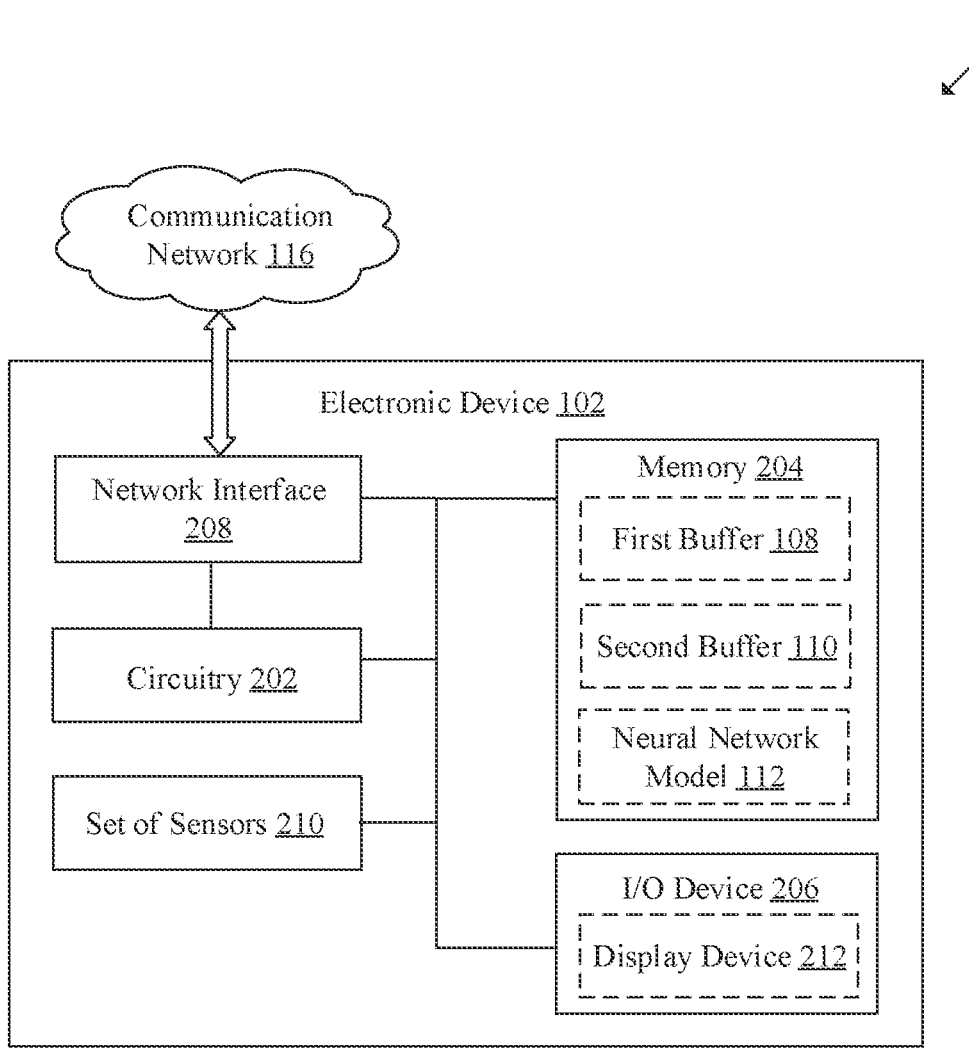
FIG. 2 is a block diagram that illustrates an exemplary electronic device for gesture recognition on resource-constrained devices, in accordance with an embodiment of the disclosure.

FIG. 2 is a block diagram that illustrates an exemplary electronic device for gesture recognition on resource-constrained devices, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a network interface 208, and a set of sensors 210. In at least one embodiment, the memory 204 may include the first buffer 108, the second buffer 110, and the neural network model 112. In at least one embodiment, the I/O device 206 may also include a display device 212. The circuitry 202 may be communicatively coupled to the memory 204, the I/O device 206, the network interface 208, and the set of sensors 210 through wired or wireless communication of the electronic device 102.

The circuitry 202 may include suitable logic, circuitry, and interfaces that may be configured to execute program instructions associated with different operations to be executed by the electronic device 102. The operations may include control of storage of a plurality of first consecutive image frames in the first buffer 108, where the plurality of first consecutive image frames may correspond to a first length of the first buffer 108. The operations may further include recognition of a first hand sign of a plurality of hand signs in a first subset of image frames of the plurality of first consecutive image frames. The operations may further include determination of whether a ratio of a number of the first subset of image frames and the first length is one of equal to or greater than a threshold. The operations may further include control of storage of the recognized first hand sign in the second buffer 110 based on the determination that the ratio is one of equal to or greater than the threshold. The operations may further include determination of a gesture corresponding to one or more hand signs of the plurality of hand signs stored in the second buffer 110. The circuitry 202 may be configured to set the first length of the first buffer 108 based on a frame rate of an image capture device (e.g. the set of sensors 210). The circuitry 202 may be configured to set the second length of the second buffer 110 based on either a type of the gesture to be determined or a number of the plurality of hand signs corresponding to the gesture. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. In at least one embodiment, the memory 204 may include the first buffer 108, the second buffer 110, and the neural network model 112. The memory 204 may store a training dataset used to train the neural network model 112. The memory 204 may further store image frames in association with specific hand signs that have been detected in the image frames. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive user inputs from the user 118, indicative of a command to trigger for recognition of a hand sign or gesture in one or more sets of consecutive image frames. Examples of the I/O device 206 may include, but are not limited to, a touch screen, a keyboard, a mouse, a joystick, a microphone, the display device 212, and a speaker.

The I/O device 206 may include the display device 212. The display device 212 may include suitable logic, circuitry, and interfaces that may be configured to receive instructions from the circuitry 202 to render, on a display screen, a plurality of image frames captured by the set of sensors 210. The plurality of image frames may include detected objects that correspond to hand signs. The display device 212 may further display a detection graphical user interface (GUI). The detection GUI may render a recognized hand sign and a determined hand gesture. The detection GUI may render on the display device 212, a hand sign (e.g. closed palm) that is recognized in an image frame that has been currently captured by the set of sensors 210. The detection GUI may further render on the display device 212, a gesture that is determined based on one or more hand signs recognized in the plurality of image frames. The display device 212 may include a touch screen which may enable the user 118 to provide a touch-input via the display device 212. The touch screen may be at least one of a resistive touch screen, a capacitive touch screen, or a thermal touch screen. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202 and the server 104, via the communication network 116. The network interface 208 may be implemented by use of various known technologies to support wired or wireless communication of the electronic device 102 with the communication network 116. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The set of sensors 210 may include suitable logic, circuitry, and interfaces that may be configured to capture a plurality of image frames that depict objects corresponding to hand signs. For example, the set of sensors 210 may include one or more image capture devices. Each of the image capture devices may include suitable logic, circuitry, and interfaces that may be configured to capture one or more image frames. The circuitry 202 may be configured to control the image capture devices to capture one or more image frames. In accordance with an embodiment, the circuitry 202 may recognize one or more hand signs in the one or more image frames and determine a hand gesture based on the recognized one or more hand signs. Examples of image capture devices may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. Although the set of sensors 210 are shown integrated with the electronic device 102, in some embodiments, the set of sensors 210 may include external sensors that may be communicably coupled to the electronic device 102.

The functions or operations executed by the electronic device 102, as described in FIG. 1, may be performed by the circuitry 202. Operations executed by the circuitry 202 are described in detail, for example, in FIGS. 3-9.

Figure 3:
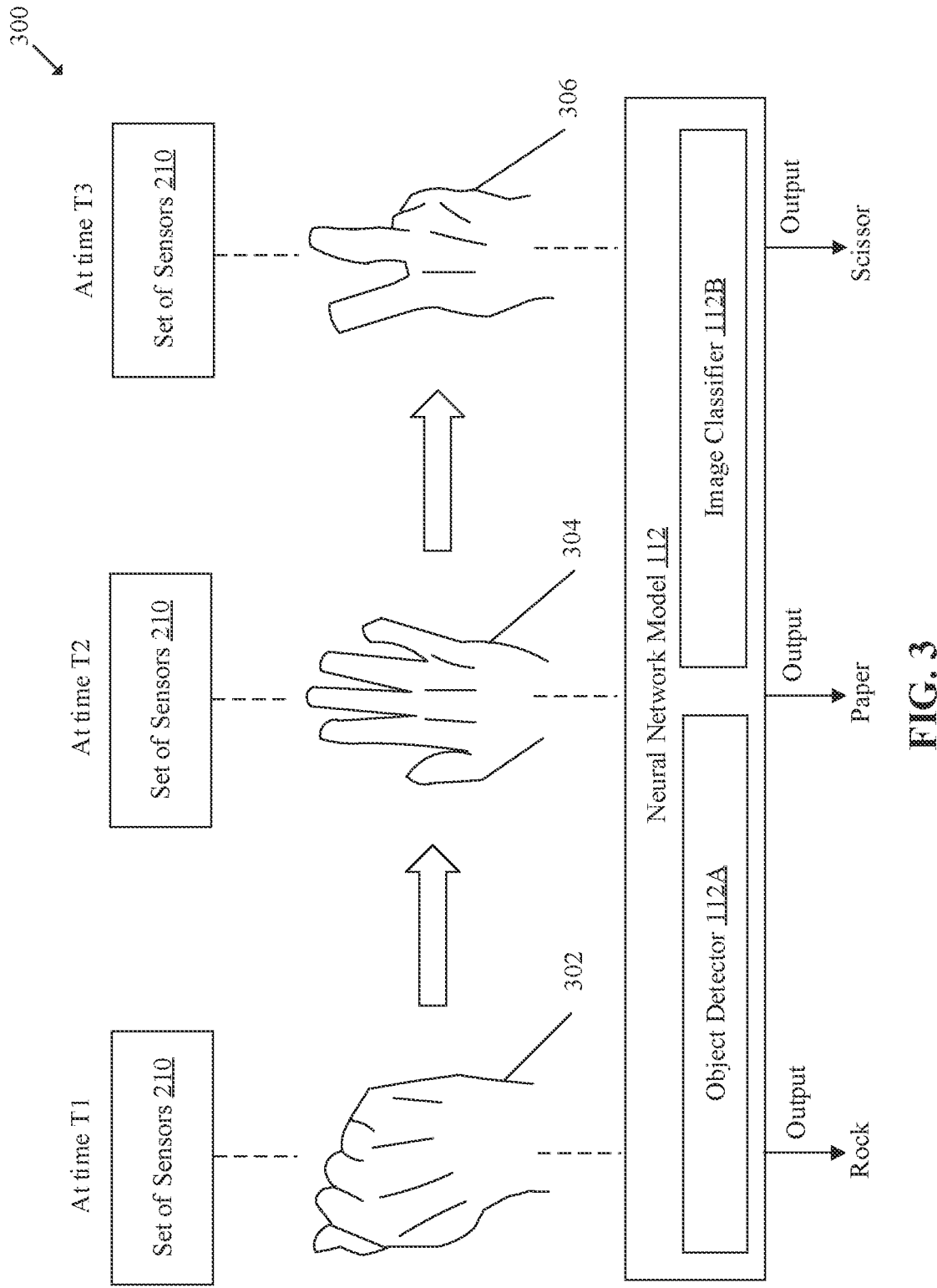
FIG. 3 is a diagram that illustrates an exemplary scenario for gesture recognition across image frames, in accordance with an embodiment of the disclosure.

FIG. 3 is a diagram that illustrates an exemplary scenario for gesture recognition across image frames, in accordance with an embodiment of the disclosure. FIG. 3 is explained in conjunction with elements from FIGS. 1 and 2. With reference to FIG. 3, there is shown an exemplary scenario 300. In the exemplary scenario 300, there is shown a set of sensors 210 associated with the electronic device 102, and the neural network model 112. The neural network model 112 may include an object detector 112*a* and/or an image classifier 112*b*.

In an embodiment, the set of sensors 210 may capture an object corresponding to three different hand signs (e.g. a first hand sign 302, a second hand sign 304, and a third hand sign 306) at three different times T-1, T-2, and T-3. In another embodiment, the set of sensors 210 may capture an object along with the motion of the object, as described, for example, in FIGS. 5-8. In an example, a gesture may include at least two hand signs (e.g. transition from closed palm to open palm). In the example shown in FIG. 3, the gesture may include a series of three hand signs. The series of the three hand signs may include a transition from closed palm (or "rock" sign) to a closed palm (or "paper" sign) to a V sign (or "scissors" sign). In an embodiment, the neural network model 112 may be optimized based on different techniques to reduce the size of the neural network model 112. In an embodiment, the neural network model 112 may include an object detector 112*a* configured to detect the object and identify the hand sign corresponding to the detected object. In another embodiment, the neural network model 112 may include an image classifier 112*b* configured to recognize the hand sign or the gesture and output a class label. In another embodiment, the neural network model 112 may utilize a combination of the object detector 112*a* and the image classifier 112*b* to recognize the hand sign or the gesture.

In a case where the gesture includes motion of the hand sign, the circuitry 202 may execute a motion tracker (e.g. object tracking or motion estimation using pixel subtraction) on the identified hand sign. The motion tracker may estimate the motion of the object (e.g. hand sign) to determine the gesture based on a look-up table. The details of the motion tracker are further described, for example, in FIGS. 5-8. In order to improve the accuracy of the neural network model 112 for detection of the hand sign, the circuitry 202 may execute a noise suppression technique based on a ring buffer (e.g. the first buffer 108), where the frequency of occurrence of each hand sign in a set of consecutive image frames is computed. The number of the set of consecutive images frames may correspond to the size of the ring buffer. The details of the noise suppression technique based on the frequency of occurrence are further described, for example, in FIG. 4. In another embodiment, the circuitry 202 may execute the noise suppression technique based on a strength of a signal corresponding to each recognized hand sign in the first buffer 108. The details of the noise suppression technique based on the strength of the signal are further described, for example, in FIG. 9.

In an embodiment, the object detector 112a may execute object tracking techniques that combine object detection with time-series analysis or object matching/re-detection and tracklet association for object tracking. The object detector 112a may classify the hand sign captured in the image frames, and provide localization information (e.g. location of the detected object across image frames). The object detector 112a may track the movement of the hand sign spatially and temporally. The object detector 112a may determine a bounding box for each object that encloses the detected object in each image frame of the plurality of image frames. The bounding box may corresponds to a set of coordinates in a respective image frame of the plurality of image frames. The object detector 112a may track the bounding box across a threshold number of image frames. The threshold number of image frames may be configurable, and may be set based on different conditions (e.g. image capture conditions, complexity of gesture, etc.). The object detector 112a may estimate the direction of the motion of the object at the end of a predetermined number of tracks or image frames based on the set threshold number of image frames.

In an embodiment, the image classifier 112b may be trained to identify the object based on a set of target classes. For example, the image classifier 112b may be configured to output a class label (e.g. hand sign) for each image frame of the plurality of image frames. The image classifier 112b may be optimized for size constraint of the electronic device 102. For example, the size of the image classifier 112b may be less 100 kilobytes without quantization. The image classifier 112b may have a low inference time of about 50 milliseconds (ms). The circuitry 202 may execute motion estimation based on the output of the image classifier 112b to determine the position of the hand sign and the motion of the hand sign. For example, the circuitry 202 may perform pixel-wise subtraction between consecutive image frames of the plurality of image frames to obtain a motion vector. In an example, the object detector 112a and the image classifier 112b may be built using NNabla® framework.

In an embodiment, the circuitry 202 may utilize a look-up table to interpret the gesture. The look-up table may be configured to store a plurality of gesture classes in association with respective actions. For example, the look-up table may include different combinations of hand signs in association with gesture classes and respective actions. In another example, the look-up table may include different combinations of hand signs and motions in association with gesture classes and respective actions. The circuitry 202 may be configured to combine the output of the neural network model 112 and the output of the motion tracker, and may interpret the meaning of the gesture from the look-up table. In an embodiment, the neural network model 112, the motion tracker, and the look-up table may be separate entities in the electronic device 102. For example, the neural network model 112 may output the hand sign as "paper", and the motion tracker may output the motion of the "paper"

hand sign to be clockwise direction from top to bottom. The circuitry 202 may combine the output from the neural network model 112 and the motion tracker, and interpret the gesture as "zoom-in" based on the look-up table.

In another example, the neural network model 112 may output the hand sign as "paper", and the motion tracker may output the motion of the "paper" hand sign to be anticlockwise direction from top to bottom. The circuitry 202 may combine the output from the neural network model 112 and the motion tracker, and interpret the gesture as "zoom-out" based on the look-up table. Table 1 shows an example of the look-up table. In Table 1, a gesture may include one of a combination of a hand sign and motion of the hand sign, a combination of a series of hand signs without motion, or a combination of a series of hand signs with motion. It will be understood that the examples of hand signs and motions shown in Table 1 are for description purposes only, and multiple permutations and combinations of hand signs and motions of the hand sings are possible in the look-up table for interpretation of actions. In an embodiment, the look-up table may be customizable and extendable to include any number of gestures and types of gestures and associated actions based on the application of the gesture recognition.

TABLE 1

An example of look-up table for interpretation of gestures

| Gesture | | | |
|---|---|---|---|
| Hand sign 1 | Hand sign 2 | Motion | Action |
| Paper (open palm) | — | Clockwise top to bottom | Zoom-in |
| Paper (open palm) | — | Anti-Clockwise top to bottom | Zoom-out |
| Rock (closed palm) | | Left to right | Zoom-in |
| Rock (closed palm) | | Right to left | Zoom-out |
| Paper (open palm) | — | Top to bottom | Swipe down |
| Paper (open palm) | — | Bottom to top | Swipe up |
| Paper (open palm) | — | Left to right | Swipe right |
| Paper (open palm) | — | Right to left | Swipe left |
| Scissors (V sign) | — | Left to right | Rotate right |
| Scissors (V sign) | — | Right to left | Rotate left |
| Paper (open palm) | Rock (closed palm) | — | Merge |
| Rock (closed palm) | Paper (open palm) | — | Split |

In the exemplary scenario 300, at time T1, the set of sensors 210 may capture a plurality of first consecutive image frames of the object. The object may correspond to a first hand sign 302 at time T1. The neural network model 112 may be trained to recognize a plurality of hand signs including the first hand sign 302. The circuitry 202 may be configured to recognize the first hand sign 302 based on the output of the neural network model 112. In an example, the circuitry 202 may recognize the first hand sign 302 in a first subset of image frames of the plurality of first consecutive image frames. In accordance with an embodiment, the circuitry 202 may apply one of the object detector 112a or the image classifier 112b to identify the first hand sign 302 in the first subset of image frames. The circuitry 202 may input the plurality of first consecutive image frames from the set of sensors 210 to the first buffer 108. In an embodiment, the circuitry 202 may input a frame number of each of the plurality of first consecutive image frames and the corresponding recognized hand sign to the first buffer 108. As shown in FIG. 3, the first hand sign recognized at time T1 may be a "rock" hand sign (e.g. a closed palm). At time T1, the circuitry 202 may input the information (e.g. class label) of the first hand sign to the second buffer 110.

The plurality of first consecutive image frames may comprise a second subset of image frames different from the first subset of image frames. The second subset of image frames may correspond to one of a transition noise, an unrecognized class, or a second hand sign. The neural network model 112 may detect a transition noise across the second subset of image frames in a case where the first hand sign (e.g. "rock") is transitioned to the second hand sign (e.g. "paper" or open palm). An unrecognized class may include a class label that does not belong the recognized classes of hand signs or gestures that the neural network model 112 is trained to recognize.

At time T2, the set of sensors 210 may capture a plurality of second consecutive image frames of the object. The object may correspond to a second hand sign 304 at time T2. The neural network model 112 may be trained to recognize a plurality of hand signs including the second hand sign 304. The circuitry 202 may be configured to recognize the second hand sign 304 based on the output of the neural network model 112. In an example, the circuitry 202 may recognize the second hand sign 304 in a first subset of image frames of the plurality of second consecutive image frames. In accordance with an embodiment, the circuitry 202 may apply one of the object detector 112a or the image classifier 112b to identify the second hand sign 304 in the first subset of image frames. The circuitry 202 may input the plurality of second consecutive image frames from the set of sensors 210 to the first buffer 108.

The circuitry 202 may be configured to store the plurality of second consecutive image frames in the first buffer 108 by replacement of the plurality of first consecutive image frames in the first buffer 108. In an embodiment, the circuitry 202 may input a frame number of each of the plurality of second consecutive image frames and the corresponding recognized hand sign to the first buffer 108. As shown in FIG. 3, the second hand sign recognized at time T2 may be a "paper" hand sign (e.g. open palm). At time T2, the circuitry 202 may input the information (e.g. class label) of the second hand sign to the second buffer 110. The plurality of second consecutive image frames may comprise a second subset of image frames different from the first subset of image frames. The second subset of image frames may correspond to one of a transition noise, an unrecognized class, or a third hand sign.

At time T3, the set of sensors 210 may capture a plurality of third consecutive image frames of the object. The object may correspond to a third hand sign 306 at time T3. The neural network model 112 may be trained to recognize a plurality of hand signs including the third hand sign 306. The circuitry 202 may be configured to recognize the third hand sign 306 based on the output of the neural network model 112. In an example, the circuitry 202 may recognize the third hand sign 306 in a first subset of image frames of the plurality of third consecutive image frames. In accordance with an embodiment, the circuitry 202 may apply one of the object detector 112a or the image classifier 112b to identify the third hand sign 306 in the first subset of image frames. The circuitry 202 may input the plurality of third consecutive image frames from the set of sensors 210 to the first buffer 108. The circuitry 202 may be configured to store the plurality of third consecutive image frames in the first buffer 108 by replacement of the plurality of second consecutive image frames in the first buffer 108. In an embodiment, the circuitry 202 may input a frame number of each of the plurality of third consecutive image frames and the corresponding recognized hand sign to the first buffer 108. As shown in FIG. 3, the third hand sign recognized at time T1 may be a "scissors" hand sign (e.g. a V sign). The plurality of third consecutive image frames may comprise a second subset of image frames different from the first subset of image frames. The second subset of image frames may correspond to one of a transition noise or an unrecognized class.

Figure 4:
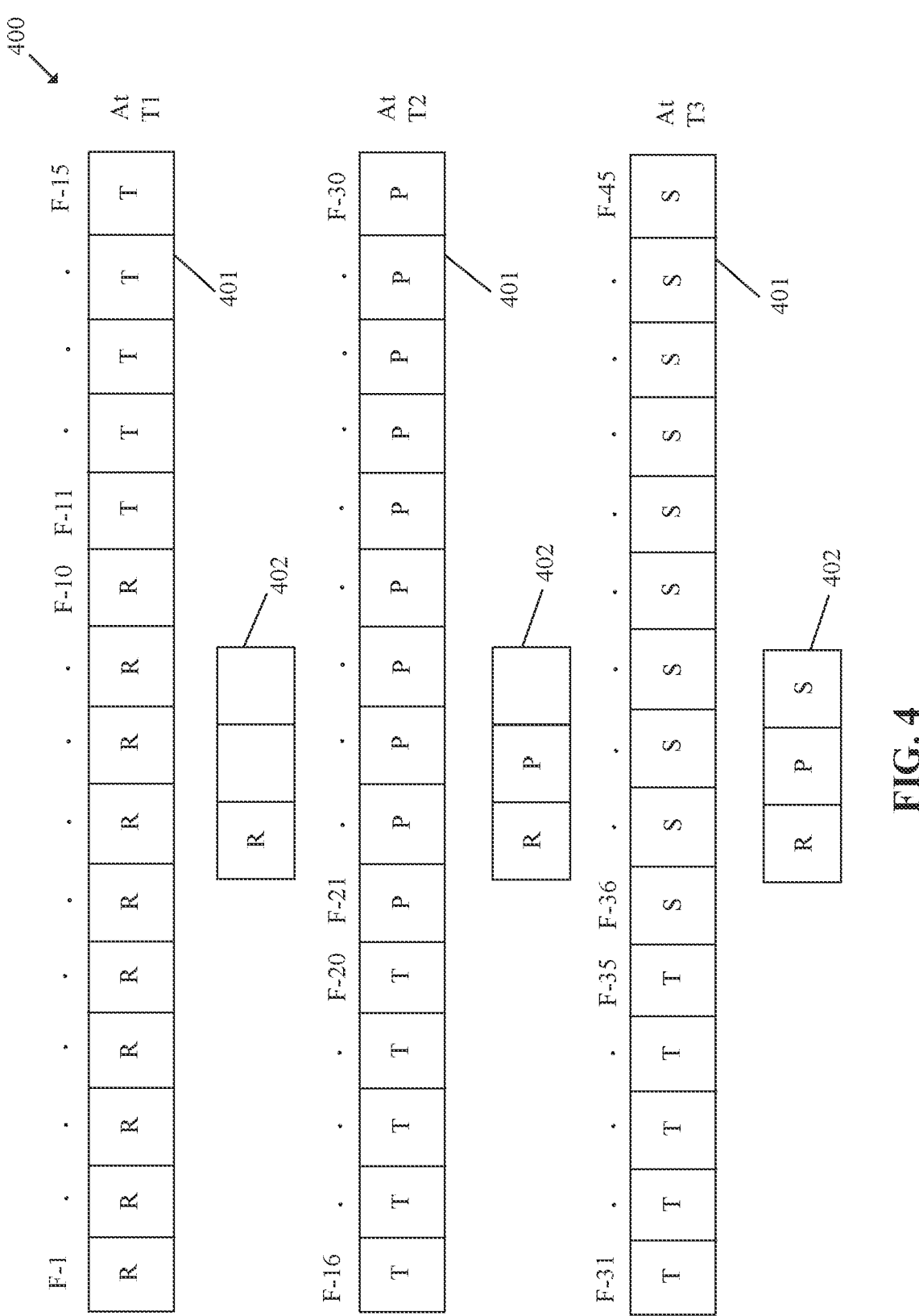
FIG. 4 is a diagram that illustrates an exemplary scenario for determination of a gesture using a buffer-based noise suppression algorithm, in accordance with an embodiment of the disclosure.

FIG. 4 is a diagram that illustrates an exemplary scenario for determination of a gesture using a buffer-based noise suppression algorithm, in accordance with an embodiment of the disclosure. FIG. 4 is explained in conjunction with elements from FIGS. 1-3. With reference to FIG. 4, there is shown an exemplary scenario 400. In the exemplary scenario 400, there is shown a first buffer 401 and a second buffer 402. The functionality and structure of the first buffer 401 may be similar to the first buffer 108 in FIG. 1, and the functionality and structure of the second buffer 402 may be similar to the second buffer 110 in FIG. 1. In the exemplary scenario 400, there is shown statuses of the first buffer 401 and the status of the second buffer 402 at three time instants, i.e., a first time instant (T1), a second time instant (T2), and a third time instant (T3).

As shown in FIG. 4, the first buffer 401 may include a configurable number of blocks corresponding to a first length. In an example, the circuitry 202 may set the length of the first buffer to be 15 blocks based on the frame rate of the image capture device (e.g. set of sensors 210). For example, the first buffer 401 may store 15 consecutive image frames along with information (e.g. class labels) of respective detected hand signs at a particular time instant. In another example, the first buffer 401 may store frame numbers of the 15 consecutive image frames along with class labels at a particular time instant. The first 15 consecutive image frames stored in the first buffer 401 at time instant T1 may comprise a plurality of first consecutive image frames. The first 15 consecutive image frames stored in the first buffer 401 at time instant T2 may comprise a plurality of second consecutive image frames. The first 15 consecutive image frames stored in the first buffer 401 at time instant T3 may comprise a plurality of third consecutive image frames.

The second buffer 402 may be of a second length, which may be set based on the type or complexity of the gesture. For example, the second buffer 110 may store three hand signs recognized across time instants T1-T3. For example, the circuitry 202 may store information (e.g. class label) of a first hand sign recognized in the first plurality of first consecutive image frames at time instant T1. The circuitry 202 may store information (e.g. class label) of a second hand sign recognized in the second plurality of first consecutive image frames at time instant T2. The circuitry 202 may store information (e.g. class label) of a third hand sign recognized in the third plurality of first consecutive image frames at time instant T3. The circuitry 202 may determine a gesture based on the information of the hand signs stored in the second buffer 402 at the end of time T3.

At time T1, the circuitry 202 may receive the plurality of first consecutive image frames. The plurality of first consecutive image frames may include 15 image frames with frame numbers F-1 to F-15. The circuitry 202 may be configured to store the plurality of first consecutive image frames or frame numbers F-1 to F-15 along with the detected hand sign in each image frame in the first buffer 401. The circuitry 202 may be configured to apply the neural network model 112 to the plurality of first consecutive image frames (F-1 to F-15) to recognize a hand sign in each of the plurality of first consecutive image frames (F-1 to F-15). The circuitry 202 may recognize a first hand sign (e.g. "rock" or closed palm) in a first subset of image frames (F-1 to F-10) of the plurality of first consecutive image frames stored in the first buffer 401. The circuitry 202 may detect a transition noise or an unrecognized hand sign in a second subset of image frames (F-11 to F-15) of the plurality of first consecutive image frames stored in the first buffer 401. The neural network model 112 may detect transition noise in the second subset of image frames (i.e. F-11 to F-15), because the second subset of image frames may capture a transition from the first hand sign to a second hand sign subsequent to the first subset of image frames in which the first hand sign is recognized.

The circuitry 202 may be further configured to determine whether a ratio of number of the first subset of image frames (F-1 to F-10), in which the first hand sign (e.g. rock) is detected, and the first length of the first buffer 401 is equal to or greater than a threshold. The ratio may indicate a frequency of occurrence of the first hand sign in the plurality of first consecutive image frames (F-1 to F-15). In an embodiment, the threshold may be configurable and may be set based on a robustness of the neural network model 112. In an example, the threshold may be ⅔ or 0.66. For example, the circuitry 202 may determine that the ratio of number of the first subset of image frames (e.g. 10) and the first length (e.g. 15) of the first buffer 401 is equal to or greater than the threshold (e.g. ¹⁰⁄₁₅ is equal to or greater than 0.66). The circuitry 202 may be configured to store information (e.g. class label) of the recognized first hand sign (e.g. "rock" or "R") in a first block of the second buffer 402, based on the determination that the ratio is equal to or greater than the threshold. Alternatively, the circuitry 202 may be configured to discard the recognized first hand sign based on the determination that the ratio of number of the first subset of image frames and the first length of the first buffer 108 is less than the threshold (e.g. 0.66).

At time T2, the circuitry 202 may receive a plurality of second consecutive image frames subsequent to the plurality of first consecutive image frames. The plurality of second consecutive image frames may include 15 image frames having frame numbers F-16 to F-30. The circuitry 202 may be configured to store the plurality of second consecutive image frames or frame numbers F-16 to F-30 along with the detected hand sign in each image frame in the first buffer 401. The circuitry 202 may be replace the plurality of first consecutive image frames (F-1 to F-15) in the first buffer 401 with the plurality of second consecutive image frames in the first buffer 401. The circuitry 202 may be configured to apply the neural network model 112 on the plurality of second consecutive image frames (F-16 to F-30) to recognize a hand sign in each of the plurality of second consecutive image frames (F-16 to F-30). The circuitry 202 may recognize a second hand sign (e.g. "paper" or "open palm") in a first subset of image frames (F-21 to F-30) of the plurality of second consecutive image frames (F-16 to F-30) stored in the first buffer 401. The circuitry 202 may detect a transition noise in a second subset of image frames (F-16 to F-20) of the plurality of second consecutive image frames stored in the first buffer 401. The circuitry 202 may detect the transition noise in image frames F-16 to F-20 owing to the transition from the first hand sign (e.g. rock) to the second hand sign (e.g. "paper") between time T1 and time T2. In an example, the circuitry 202 may detect the transition noise in image frames F11-F20.

The circuitry 202 may be further configured to determine whether a ratio of a number of the first subset of image frames (F-21 to F-30), in which the second hand sign (e.g. paper) is detected, and the first length of the first buffer 401 is equal to or greater than the threshold. For example, the threshold may be ⅔ or 0.66. For example, the circuitry 202 may determine that the ratio of number of the first subset of image frames (e.g. 10) and the first length (e.g. 15) of the first buffer 401 is equal to or greater than the threshold (e.g. ¹⁰⁄₁₅ is equal to or greater than 0.66). The circuitry 202 may be configured to store information (e.g. class label) of the recognized second hand sign (e.g. "paper" or "P") in a second block of the second buffer 402, based on the determination that the ratio is equal to or greater than the threshold. Alternatively, the circuitry 202 may be configured to discard the recognized second hand sign based on the determination that the ratio of number of the first subset of image frames and the first length of the first buffer 108 is less than the threshold (e.g. 0.66).

At time T3, the circuitry 202 may receive a plurality of third consecutive image frames subsequent to the plurality of second consecutive image frames. The plurality of third consecutive image frames may include 15 image frames having frame numbers F-31 to F-45. The circuitry 202 may be configured to store the plurality of third consecutive image frames or frame numbers F-31 to F-450 along with the detected hand sign in each image frame in the first buffer 401. The circuitry 202 may be replace the plurality of second consecutive image frames (F-16 to F-30) in the first buffer 401 with the plurality of third consecutive image frames in the first buffer 401. The circuitry 202 may be configured to apply the neural network model 112 on the plurality of third consecutive image frames (F-31 to F-45) to recognize a hand sign in each of the plurality of third consecutive image frames (F-31 to F-45). The circuitry 202 may recognize a third hand sign (e.g. "scissors" or "V sign") in a first subset of image frames (F-36 to F-45) of the plurality of third consecutive image frames (F-31 to F-45) stored in the first buffer 401. The circuitry 202 may detect a transition noise in a second subset of image frames (F-31 to F-35) of the plurality of third consecutive image frames (F-31 to F-45) stored in the first buffer 401. The circuitry 202 may detect the transition noise in image frames F-31 to F-35 owing to the transition from the second hand sign (e.g. "paper") to the third hand sign (e.g. "scissors") between time T2 and time T3.

The circuitry 202 may be further configured to determine whether a ratio of number of the first subset of image frames (F-36 to F-45), in which the third hand sign (e.g. scissors) is detected, and the first length of the first buffer 401 is equal to or greater than the threshold. For example, the threshold may be ⅔ or 0.66. For example, the circuitry 202 may determine that the ratio of number of the first subset of image frames (e.g. 10) and the first length (e.g. 15) of the first buffer 401 is equal to or greater than the threshold (e.g. ¹⁰⁄₁₅ is equal to or greater than 0.66). The circuitry 202 may be configured to store information (e.g. class label) of the recognized third hand sign (e.g. "scissors" or "S") in a third block of the second buffer 402, based on the determination that the ratio is equal to or greater than the threshold. Alternatively, the circuitry 202 may be configured to discard the recognized third hand sign based on the determination that the ratio of number of the first subset of image frames and the first length of the first buffer 108 is less than the threshold (e.g. 0.66).

The circuitry 202 of the electronic device 102 may be further configured to determine a gesture based on one or more of the hand signs (e.g. "rock" (R), "paper" (P), and "scissor" (S), stored in the second buffer 110 at the end of time T3. The circuitry 202 may thereby employ the buffer-based noise suppression algorithm to suppress noise in the recognition of the gesture by the neural network model 112, by either discarding the recognized hand sign or retaining the recognized hand sign based on the frequency of occurrence and thresholding process described in the exemplary scenario 400. The buffer-based noise suppression algorithm described in the exemplary scenario 400 may produce an averaging effect, and may effectively act as an ensemble of models to increase the accuracy of the gesture recognition.

Figure 5:
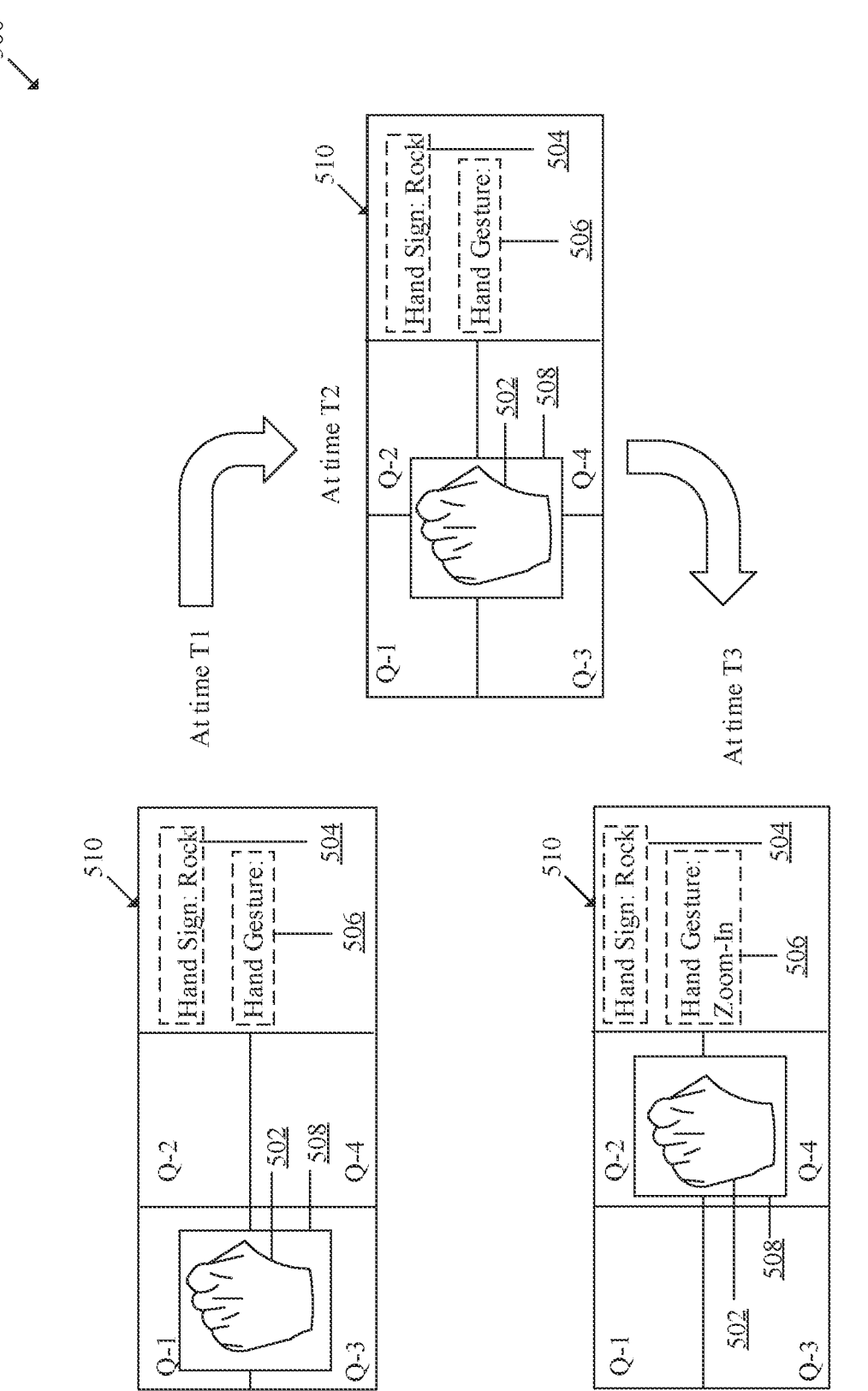
FIG. 5 is a diagram that illustrates an exemplary scenario for determination of a first gesture based on motion tracking across a plurality of consecutive image frames, in accordance with an embodiment of the disclosure.

FIG. 5 is a diagram that illustrates an exemplary scenario for determination of a first gesture based on motion tracking across a plurality of consecutive image frames, in accordance with an embodiment of the disclosure. FIG. 5 is explained in conjunction with elements from FIGS. 1-4. With reference to FIG. 5, there is shown an exemplary scenario 500. In the exemplary scenario 500, there is shown a motion tracker 510 configured to track a motion of an object 502 across a plurality of image frames.

The plurality of image frames may comprise a plurality of first consecutive image frames. The plurality of first consecutive image frames include a first set of image frames, a second set of image frames, and a third set of image frames. In an embodiment, the circuitry 202 may receive the plurality of image frames from an image capture device (e.g. set of sensors 210). The circuitry 202 may be configured to receive the first set of image frames at a first time T1. The circuitry 202 may be configured to receive the second set of image frames at a second time T2, and receive the third set of image frames at a third time T3. In an example, the object 502 may correspond to a first hand sign 504. The circuitry 202 may perform object detection or image classification on the plurality of image frames for hand sign recognition and motion tracking across the plurality of image frames for gesture determination.

In an embodiment, the neural network model 112 may be an object detector 112a. In accordance with an embodiment, the circuitry 202 may be configured to apply the object detector 112a to detect the object 502, apply the motion tracker 510 to track the motion of the detected object 502 across the plurality of image frames, determine a first gesture 506 based on the tracked motion of the object 502, and suppress noise in the determination of the first gesture 506 using the first buffer 108. The circuitry 202 may be configured to set a plurality of quadrants (Q-1, Q-2, Q-3, and Q-4) associated with each image frame of the plurality of image frames. In this case, the granularity of the tracking by the motion tracker 510 may be at a quadrant level. In another embodiment, the circuitry 202 may be configured to set a plurality of grids (e.g. 8×8 grid or 16×16 grid) associated with each image frame of the plurality of image frames. In this case, the granularity of the tracking by the motion tracker 510 may be at a grid level which may be higher than the granularity at the quadrant level. The circuitry 202 may track the motion of the object 502 via the plurality of quadrants or the plurality of grids across the plurality of image frames. As shown in FIG. 5, the circuitry 202 may set the plurality of quadrants (Q-1, Q-2, Q-3, and Q-4) associated with each of the first set of image frames, the second set of image frames, and the third set of image frames. The circuitry 202 may estimate a direction of the motion of the object 502 (e.g. hand sign) based on the recorded movement of the object 502 from one quadrant to another quadrant. In some embodiments, the circuitry 202 may track the motion of the object 502 across the plurality of grids.

At time T1, the circuitry 202 may receive the first set of image frames. The circuitry 202 may be configured to apply the object detector 112a on the first set of image frames to detect the object 502 corresponding to the first hand sign 504

(e.g. rock). The object detector 112a may detect the object 502 and classify the detected object 502. The circuitry 202 may suppress noisy classifications based on the noise suppression algorithm using the first buffer 108, as described in FIGS. 4 and 9. The circuitry 202 may recognize the object 502 as the first hand sign "rock" based on the output of the object detector 112a. Based on the output of the object detector 112a, the motion tracker 510 may be configured to determine a bounding box 508 that encloses the detected object 502 in each image frame of the plurality of image frames. The bounding box 508 may correspond to a set of coordinates in a respective image frame of the plurality of image frames. At time T1, the motion tracker 510 may determine the bounding box 508 that encloses the detected object 502 in the first set of image frames. The bounding box 508 may correspond to a first set of coordinates in a first quadrant (Q-1) and a third quadrant (Q-3) of the first set of image frames.

At time T2, the circuitry 202 may receive the second set of image frames. The circuitry 202 may be configured to apply the object detector 112a on the second set of image frames to detect the object 502 corresponding to the first hand sign 504 (e.g. rock). The object detector 112a may detect the object 502 and classify the detected object 502. The circuitry 202 may recognize the object 502 as the first hand sign "rock" based on the output of the object detector 112a. At time T2, the motion tracker 510 may determine the bounding box 508 that encloses the detected object 502 in the second set of image frames. The bounding box 508 may correspond to a second set of coordinates that spans all four quadrants (Q1-Q4) of the second set of image frames.

At time T3, the circuitry 202 may receive the third set of image frames. The circuitry 202 may be configured to apply the object detector 112a on the third set of image frames to detect the object 502 corresponding to the first hand sign 504 (e.g. rock). The object detector 112a may detect the object 502 and classify the detected object 502. The circuitry 202 may recognize the object 502 as the first hand sign "rock" based on the output of the object detector 112a. At time T3, the motion tracker 510 may determine the bounding box 508 that encloses the detected object 502 in the third set of image frames. The bounding box 508 may correspond to a third set of coordinates in a second quadrant (Q-2) and a fourth quadrant (Q-4) of the third set of image frames.

The circuitry 202 may be further configured to track the bounding box 508 across a threshold number of image frames of the plurality of image frames to estimate a motion of the detected object. For example, the threshold number of image frames may correspond to the time period between start of time T1 and end of time T3. The circuitry 202 may estimate a direction of the motion of the bounding box 508 of the object 502 across the four quadrants in the threshold number of image frames. The circuitry 202 may be further configured to determine the first gesture 506 based on the recognized first hand sign 504 and the direction of motion of the bounding box 508 across the threshold number of frames. For example, the circuitry 202 may determine the first gesture 506 as the "zoom-in" gesture based on the look-up table (Table 1).

In an embodiment, the neural network model 112 may be an image classifier 112b. In accordance with a second embodiment, the circuitry 202 may be configured to apply the image classifier 112b on the plurality of images to output a class label for each image of the plurality of images, apply the motion tracker 510 to estimate the motion of the detected object 502 across the plurality of image frames, and determine the first gesture 506 based on the estimated motion of the object 502. The circuitry 202 may track the motion of the first hand sign 504 via the plurality of quadrants (Q-1, Q-2, Q-3, and Q-4) across the plurality of image frames.

At time T1, the circuitry 202 may receive a first image frame of the plurality of consecutive image frames. The circuitry 202 may be configured to apply the image classifier 112b for execution of image classification on the first image frame. The circuitry 202 may suppress noisy classifications based on the noise suppression algorithm using the first buffer 108, as described in FIGS. 4 and 9. The circuitry 202 may identify the first hand sign 504 as "rock" in the first image frame based on the output of the image classifier 112b. The circuitry 202 may be further configured to determine pixel information associated with the first image frame.

At time T2, the circuitry 202 may receive the second image frame of the plurality of consecutive image frames. The circuitry 202 may identify the first hand sign 504 as "rock" in the second image frame based on the output of the image classifier 112b. The circuitry 202 may be further configured to determine pixel information associated with the second image frame. The motion tracker 510 may be configured to estimate a first motion vector based on first pixel difference information associated with the first image frame and the second image frame. The first pixel difference information may be determined based on a difference between the pixel information associated with the first image frame and the pixel information associated with the second image frame. The motion tracker 510 may be configured to determine a first position of the first hand sign 504 based on the first motion vector.

At time T3, the circuitry 202 may receive the third image frame of the plurality of consecutive image frames. The circuitry 202 may identify the first hand sign 504 as "rock" in the third image frame based on the output of the image classifier 112b. The circuitry 202 may be further configured to determine pixel information associated with the third image frame. The motion tracker 510 may be configured to estimate a second motion vector based on second pixel difference information associated with the second image frame and the third image frame. The second pixel difference information may be determined based on a difference between the pixel information associated with the second image frame and the pixel information associated with the third image frame. The motion tracker 510 may be further configured to determine a second position of the first hand sign 504 based on the second motion vector.

The motion tracker 510 may estimate the direction of the motion of the first hand sign 504 based on the first position and the second position at different time instants. The motion tracker 510 may estimate the direction of the motion of the first hand sign 504 based on movement of the first hand sign 504 across the quadrants. The circuitry 202 may be further configured to determine the first gesture 506 based on the tracked motion of the first hand sign 504. At the end of time T3, the circuitry 202 may determine the first gesture 506 based on the identified first hand sign 504 and the estimated direction of the motion of the first hand sign 504. The circuitry 202 may determine the first gesture 506 as "zoom-in" based on the look-up table (Table 1). In an embodiment, the circuitry 202 may be configured to display one or more of the movement of the object 502 across the quadrants Q1-Q4, the first hand sign 504, and the determined first gesture 506 on a display screen (e.g. the display device 212).

Figure 6:
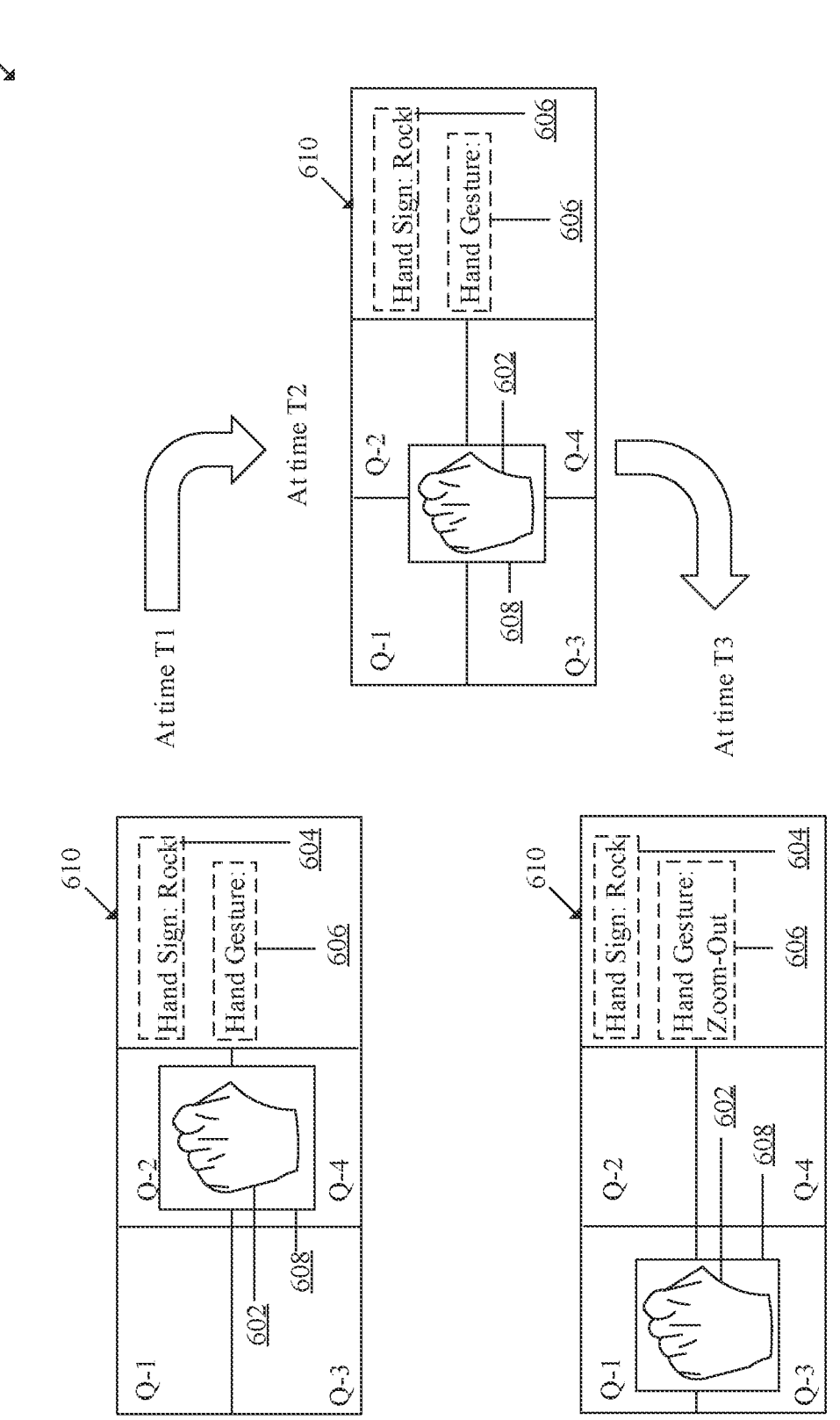
FIG. 6 is a diagram that illustrates an exemplary scenario for determination of a second gesture based on motion tracking across a plurality of consecutive image frames, in accordance with an embodiment of the disclosure.

FIG. 6 is a diagram that illustrates an exemplary scenario for determination of a second gesture based on motion tracking across a plurality of consecutive image frames, in accordance with an embodiment of the disclosure. FIG. 6 is explained in conjunction with elements from FIGS. 1-5. With reference to FIG. 6, there is shown exemplary scenario 600. In the exemplary scenario 600, there is shown a motion tracker 610 configured to track a motion of an object 602 across a plurality of image frames. The plurality of image frames may comprise a plurality of first consecutive image frames. The plurality of first consecutive image frames include a first set of image frames, a second set of image frames, and a third set of image frames. The circuitry 202 may be configured to receive the first set of image frames at a first time T1. The circuitry 202 may be configured to receive the second set of image frames at a second time T2, and receive the third set of image frames at a third time T3.

In an embodiment, the neural network model 112 may be the object detector 112a. At time T1, the circuitry 202 may receive the first set of image frames. The circuitry 202 may be configured to apply the object detector 112a on the first set of image frames to detect the object 602 corresponding to the first hand sign 604 (e.g. rock). The object detector 112a may detect the object 602 and classify the detected object 602. The circuitry 202 may suppress noisy classifications based on the noise suppression algorithm using the first buffer 108, as described in FIGS. 4 and 9. The circuitry 202 may recognize the object 602 as the first hand sign "rock" based on the output of the object detector 112a. Based on the output of the object detector 112a, the motion tracker 610 may be configured to determine a bounding box 608 that encloses the detected object 602 in each image frame of the plurality of image frames. At time T1, the motion tracker 610 may determine the bounding box 608 that encloses the detected object 602 in the first set of image frames. The bounding box 608 may correspond to a first set of coordinates in a second quadrant (Q-2) and a fourth quadrant (Q-4) of the first set of image frames.

At time T2, the circuitry 202 may receive the second set of image frames. The circuitry 202 may be configured to apply the object detector 112a on the second set of image frames to detect the object 602 corresponding to the first hand sign 604 (e.g. rock). The object detector 112a may detect the object 602 and classify the detected object 602. The circuitry 202 may recognize the object 602 as the first hand sign "rock" based on the output of the object detector 112a. At time T2, the motion tracker 610 may determine the bounding box 608 that encloses the detected object 602 in the second set of image frames. The bounding box 608 may correspond to a second set of coordinates that spans all four quadrants (Q1-Q4) of the second set of image frames.

At time T3, the circuitry 202 may receive the third set of image frames. The circuitry 202 may be configured to apply the object detector 112a on the third set of image frames to detect the object 602 corresponding to the first hand sign 604 (e.g. rock). The object detector 112a may detect the object 602 and classify the detected object 602. The circuitry 202 may recognize the object 602 as the first hand sign "rock" based on the output of the object detector 112a. At time T3, the motion tracker 610 may determine the bounding box 608 that encloses the detected object 602 in the third set of image frames. The bounding box 608 may correspond to a third set of coordinates in the first quadrant (Q-1) and the third quadrant (Q-3) of the third set of image frames.

The circuitry 202 may be further configured to track the bounding box 608 across a threshold number of image frames of the plurality of image frames to estimate a motion of the detected object. For example, the threshold number of image frames may correspond to the time period between start of time T1 and end of time T3. The circuitry 202 may estimate a direction of the motion of the bounding box 608 of the object 602 across the four quadrants in the threshold number of image frames. The circuitry 202 may be further configured to determine the second gesture 606 based on the direction of motion of the bounding box 608 across the threshold number of frames. For example, the circuitry 202 may determine the second gesture 606 as the "zoom-out" gesture based on the look-up table (Table 1).

In an embodiment, the neural network model 112 may be an image classifier 112b. At time T1, the circuitry 202 may receive a first image frame of the plurality of consecutive image frames. The circuitry 202 may be configured to apply the image classifier 112b for execution of image classification on the first image frame. The circuitry 202 may suppress noisy classifications based on the noise suppression algorithm using the first buffer 108, as described in FIGS. 4 and 9. The circuitry 202 may identify the first hand sign 604 as "rock" in the first image frame based on the output of the image classifier 112b. The circuitry 202 may be further configured to determine pixel information associated with the first image frame.

At time T2, the circuitry 202 may receive the second image frame of the plurality of consecutive image frames. The circuitry 202 may identify the first hand sign 604 as "rock" in the second image frame based on the output of the image classifier 112b. The circuitry 202 may be further configured to determine pixel information associated with the second image frame. The motion tracker 610 may be configured to estimate a first motion vector based on first pixel difference information associated with the first image frame and the second image frame. The first pixel difference information may be determined based on a difference between the pixel information associated with the first image frame and the pixel information associated with the second image frame. The motion tracker 610 may be configured to determine a first position of the first hand sign 604 based on the first motion vector.

At time T3, the circuitry 202 may receive the third image frame of the plurality of consecutive image frames. The circuitry 202 may identify the first hand sign 604 as "rock" in the third image frame based on the output of the image classifier 112b. The circuitry 202 may be further configured to determine pixel information associated with the third image frame. The motion tracker 610 may be configured to estimate a second motion vector based on second pixel difference information associated with the second image frame and the third image frame. The second pixel difference information may be determined based on a difference between the pixel information associated with the second image frame and the pixel information associated with the third image frame. The motion tracker 610 may be further configured to determine a second position of the first hand sign 604 based on the second motion vector.

The motion tracker 610 may estimate the direction of the motion of the first hand sign 604 based on the first position and the second position at different time instants. The motion tracker 610 may estimate the direction of the motion of the first hand sign 604 based on movement of the first hand sign 604 across the quadrants (Q1-Q4). At the end of time T3, the circuitry 202 may determine the second gesture 606 based on the estimated direction of the motion of first hand sign 604. The circuitry 202 may determine the second gesture 606 as "zoom-out" based on the look-up table (Table 1).

Figure 7:
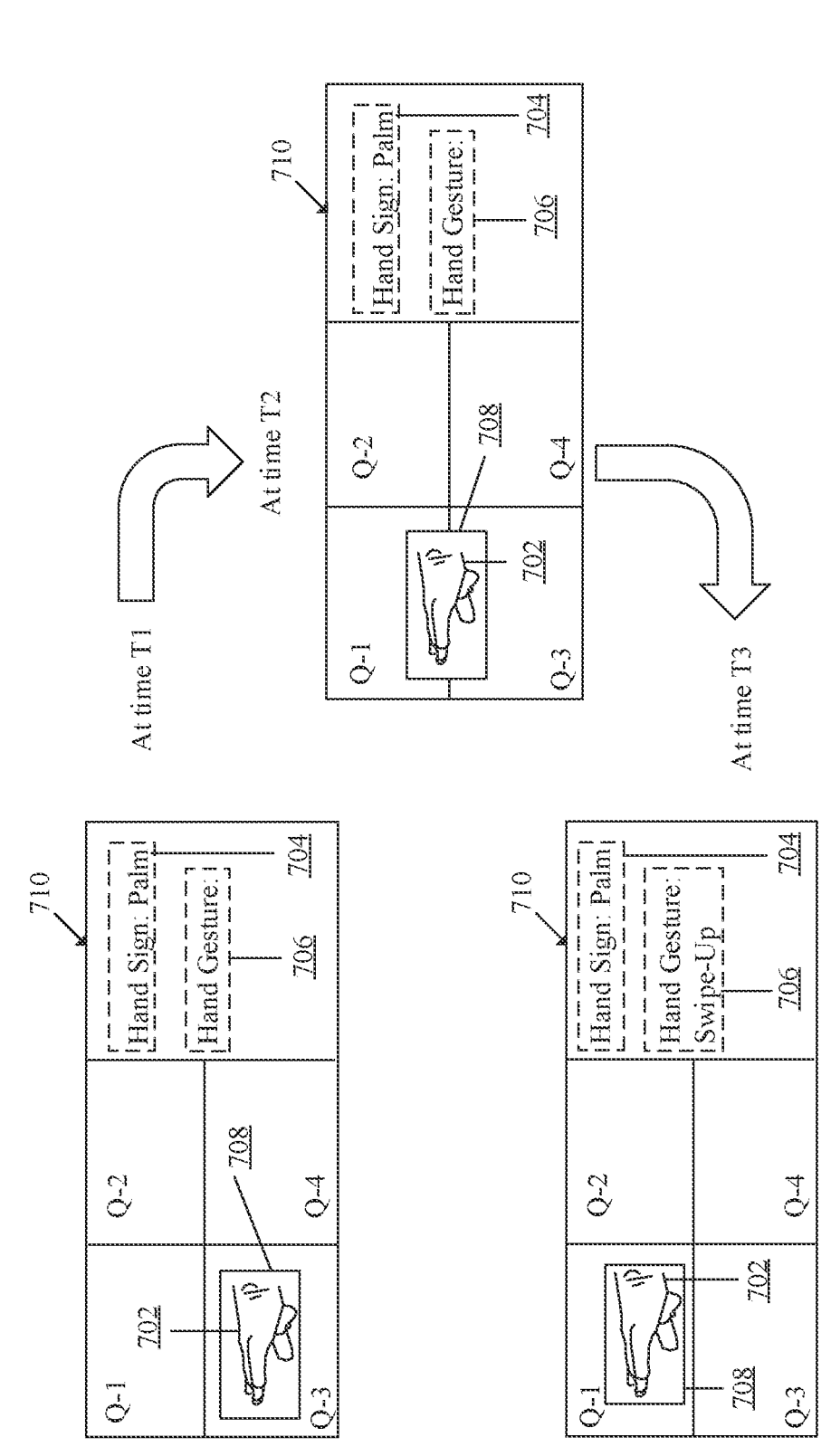
FIG. 7 is a diagram that illustrates an exemplary scenario for determination of a third gesture based on motion tracking across a plurality of consecutive image frames, in accordance with an embodiment of the disclosure.

FIG. 7 is a diagram that illustrates an exemplary scenario for determination of a third gesture based on motion tracking across a plurality of consecutive image frames, in accordance with an embodiment of the disclosure. FIG. 7 is explained in conjunction with elements from FIG. 1-6. With reference to FIG. 7, there is shown an exemplary scenario 700. In the exemplary scenario 700, there is shown a motion tracker 710 configured to track a motion of an object 702 across a plurality of image frames. The plurality of image frames may comprise a plurality of first consecutive image frames. The plurality of first consecutive image frames include a first set of image frames, a second set of image frames, and a third set of image frames. The circuitry 202 may be configured to receive the first set of image frames at a first time T1. The circuitry 202 may be configured to receive the second set of image frames at a second time T2, and receive the third set of image frames at a third time T3.

In an embodiment, the neural network model 112 may be the object detector 112a. At time T1, the circuitry 202 may receive the first set of image frames. The circuitry 202 may be configured to apply the object detector 112a on the first set of image frames to detect the object 702 corresponding to a second hand sign 704 (e.g. "palm" or "open palm"). The object detector 112a may detect the object 702 and classify the detected object 702. The circuitry 202 may suppress noisy classifications based on the noise suppression algorithm using the first buffer 108, as described in FIGS. 4 and 9. The circuitry 202 may recognize the object 702 as the second hand sign "open palm" based on the output of the object detector 112a. Based on the output of the object detector 112a, the motion tracker 710 may be configured to determine a bounding box 708 that encloses the detected object 702 in each image frame of the plurality of image frames. The bounding box 708 may correspond to a set of coordinates in a respective image frame of the plurality of image frames. At time T1, the motion tracker 710 may determine the bounding box 708 that encloses the detected object 702 in the first set of image frames. The bounding box 708 may correspond to a first set of coordinates in a third quadrant (Q-3) of the first set of image frames.

At time T2, the circuitry 202 may receive the second set of image frames. The circuitry 202 may be configured to apply the object detector 112a on the second set of image frames to detect the object 702 corresponding to the second hand sign 704 (e.g. open palm). The object detector 112a may detect the object 702 and classify the detected object 702. The circuitry 202 may recognize the object 702 as the second hand sign "open palm" based on the output of the object detector 112a. At time T2, the motion tracker 710 may determine the bounding box 708 that encloses the detected object 702 in the second set of image frames. The bounding box 708 may correspond to a second set of coordinates in first and third quadrants (Q1 and Q3) of the second set of image frames.

At time T3, the circuitry 202 may receive the third set of image frames. The circuitry 202 may be configured to apply the object detector 112a on the third set of image frames to detect the object 702 corresponding to the second hand sign 704 (e.g. open palm). The object detector 112a may detect the object 702 and classify the detected object 702. The circuitry 202 may recognize the object 702 as the second hand sign "open palm" based on the output of the object detector 112a. At time T3, the motion tracker 710 may determine the bounding box 708 that encloses the detected object 702 in the third set of image frames. The bounding box 708 may correspond to a third set of coordinates in the first quadrant (Q-1) of the third set of image frames.

The circuitry 202 may be further configured to track the bounding box 708 across a threshold number of image frames of the plurality of image frames to estimate a motion of the detected object. For example, the threshold number of image frames may correspond to the time period between the start of time T1 and the end of time T3. The circuitry 202 may estimate a direction of the motion of the bounding box 708 of the object 702 across the quadrants in the threshold number of image frames. The circuitry 202 may be further configured to determine the third gesture 706 based on the direction of motion of the bounding box 708 across the threshold number of frames. For example, the circuitry 202 may determine the third gesture 706 as the "swipe up" gesture based on the look-up table (Table 1).

In an embodiment, the neural network model 112 may be an image classifier 112b. At time T1, the circuitry 202 may receive a first image frame of the plurality of consecutive image frames. The circuitry 202 may be configured to apply the image classifier 112b for execution of image classification on the first image frame. The circuitry 202 may suppress noisy classifications based on the noise suppression algorithm using the first buffer 108, as described in FIGS. 4 and 9. The circuitry 202 may identify the second hand sign 704 as "open palm" in the first image frame based on the output of the image classifier 112b. The circuitry 202 may be further configured to determine pixel information associated with the first image frame.

At time T2, the circuitry 202 may receive the second image frame of the plurality of consecutive image frames. The circuitry 202 may identify the second hand sign 704 as "open palm" in the second image frame based on the output of the image classifier 112b. The circuitry 202 may be further configured to determine pixel information associated with the second image frame. The motion tracker 710 may be configured to estimate a first motion vector based on first pixel difference information associated with the first image frame and the second image frame. The first pixel difference information may be determined based on a difference between the pixel information associated with the first image frame and the pixel information associated with the second image frame. The motion tracker 710 may be configured to determine a first position of the second hand sign 704 based on the first motion vector.

At time T3, the circuitry 202 may receive the third image frame of the plurality of consecutive image frames. The circuitry 202 may identify the second hand sign 704 as "open palm" in the third image frame based on the output of the image classifier 112b. The circuitry 202 may be further configured to determine pixel information associated with the third image frame. The motion tracker 710 may be configured to estimate a second motion vector based on second pixel difference information associated with the second image frame and the third image frame. The second pixel difference information may be determined based on a difference between the pixel information associated with the second image frame and the pixel information associated with the third image frame. The motion tracker 710 may be further configured to determine a second position of the second hand sign 704 based on the second motion vector.

The motion tracker 710 may estimate the direction of the motion of the second hand sign 704 based on the first position and the second position at different time instants. The motion tracker 710 may estimate the direction of the motion of the second hand sign 704 based on movement of the second hand sign 704 across the quadrants. At the end of time T3, the circuitry 202 may determine the third gesture 706 based on the estimated direction of the motion of the second hand sign 704. The circuitry 202 may determine the third gesture 706 as "swipe up" based on the look-up table (Table 1).

Figure 8:
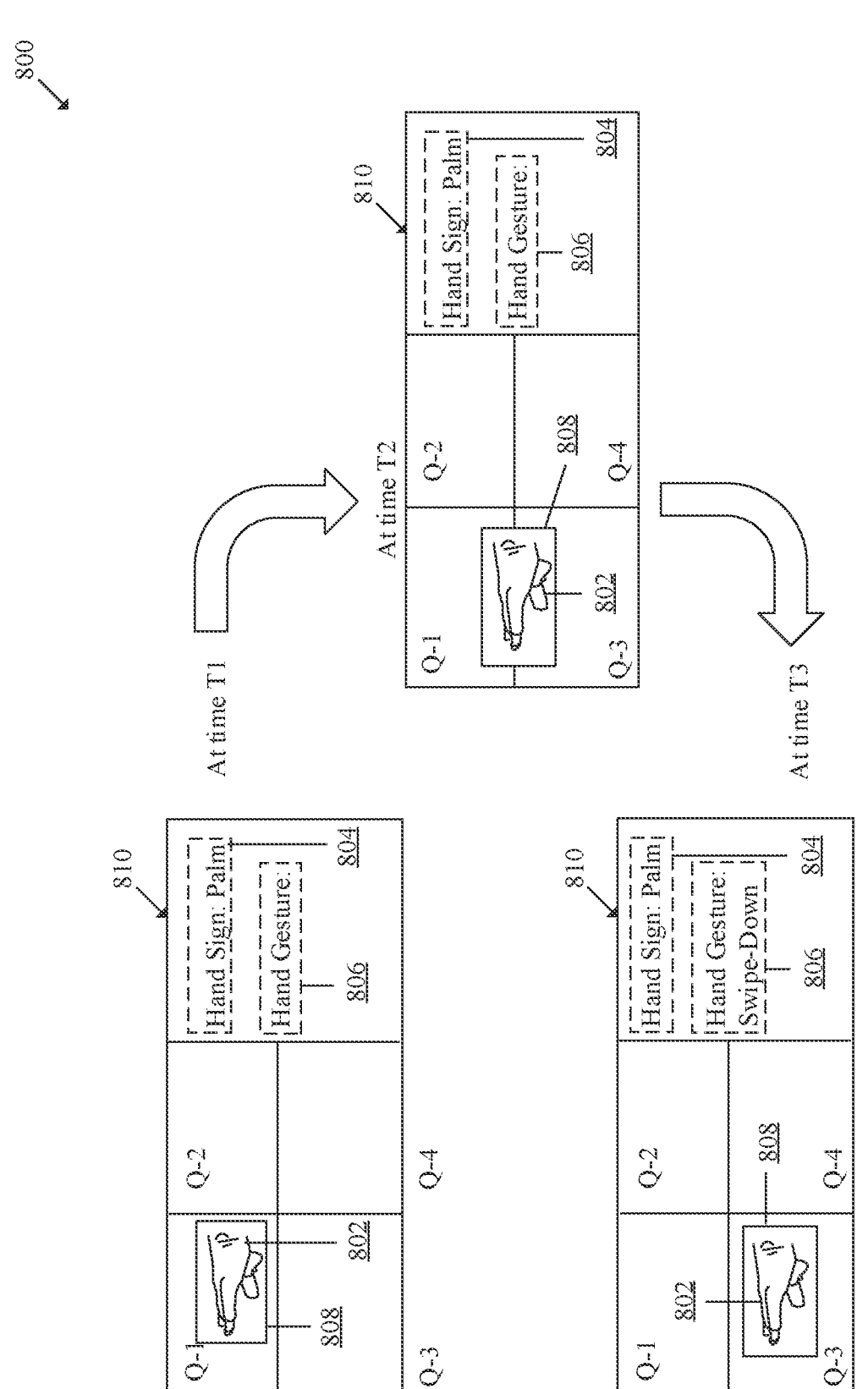
FIG. 8 is a diagram that illustrates an exemplary scenario for determination of a fourth gesture based on motion tracking across a plurality of consecutive image frames, in accordance with an embodiment of the disclosure.

FIG. 8 is a diagram that illustrates an exemplary scenario for determination of a fourth gesture based on motion tracking across a plurality of consecutive image frames, in accordance with an embodiment of the disclosure. FIG. 8 is explained in conjunction with elements from FIGS. 1-7. With reference to FIG. 8, there is shown an exemplary scenario 800. In the exemplary scenario 800, there is shown a motion tracker 810 configured to track a motion of an object 802 across a plurality of image frames. The plurality of image frames may comprise a plurality of first consecutive image frames. The plurality of first consecutive image frames include a first set of image frames, a second set of image frames, and a third set of image frames. The circuitry 202 may be configured to receive the first set of image frames at a first time T1. The circuitry 202 may be configured to receive the second set of image frames at a second time T2, and receive the third set of image frames at a third time T3.

In an embodiment, the neural network model 112 may be the object detector 112a. At time T1, the circuitry 202 may receive the first set of image frames. The circuitry 202 may be configured to apply the object detector 112a on the first set of image frames to detect the object 802 corresponding to a second hand sign 804 (e.g. "palm" or "open palm"). The object detector 112a may detect the object 802 and classify the detected object 802. The circuitry 202 may suppress noisy classifications based on the noise suppression algorithm using the first buffer 108, as described in FIGS. 4 and 9. The circuitry 202 may recognize the object 802 as the second hand sign "open palm" based on the output of the object detector 112a. Based on the output of the object detector 112a, the motion tracker 810 may be configured to determine a bounding box 808 that encloses the detected object 802 in each image frame of the plurality of image frames. The bounding box 808 may correspond to a set of coordinates in a respective image frame of the plurality of image frames. At time T1, the motion tracker 810 may determine the bounding box 808 that encloses the detected object 802 in the first set of image frames. The bounding box 808 may correspond to a first set of coordinates in a first quadrant (Q-1) of the first set of image frames.

At time T2, the circuitry 202 may receive the second set of image frames. The circuitry 202 may be configured to apply the object detector 112a on the second set of image frames to detect the object 802 corresponding to the second hand sign 804 (e.g. open palm). The object detector 112a may detect the object 802 and classify the detected object 802. The circuitry 202 may recognize the object 802 as the second hand sign "open palm" based on the output of the object detector 112a. At time T2, the motion tracker 810 may determine the bounding box 808 that encloses the detected object 802 in the second set of image frames. The bounding box 808 may correspond to a second set of coordinates in first and third quadrants (Q1 and Q3) of the second set of image frames.

At time T3, the circuitry 202 may receive the third set of image frames. The circuitry 202 may be configured to apply the object detector 112a on the third set of image frames to detect the object 802 corresponding to the second hand sign 804 (e.g. open palm). The object detector 112a may detect the object 802 and classify the detected object 802. The circuitry 202 may recognize the object 802 as the second hand sign "open palm" based on the output of the object detector 112a. At time T3, the motion tracker 810 may determine the bounding box 808 that encloses the detected object 802 in the third set of image frames. The bounding box 808 may correspond to a third set of coordinates in the third quadrant (Q-3) of the third set of image frames.

The circuitry 202 may be further configured to track the bounding box 808 across a threshold number of image frames of the plurality of image frames to estimate a motion of the detected object. For example, the threshold number of image frames may correspond to the time period between the start of time T1 and the end of time T3. The circuitry 202 may estimate a direction of the motion of the bounding box 808 of the object 802 across the quadrants in the threshold number of image frames. The circuitry 202 may be further configured to determine the fourth gesture 806 based on the direction of motion of the bounding box 808 across the threshold number of frames. For example, the circuitry 202 may determine the fourth gesture 806 as the "swipe down" gesture based on the look-up table (Table 1).

In an embodiment, the neural network model 112 may be an image classifier 112b. At time T1, the circuitry 202 may receive a first image frame of the plurality of consecutive image frames. The circuitry 202 may be configured to apply the image classifier 112b for execution of image classification on the first image frame. The circuitry 202 may suppress noisy classifications based on the noise suppression algorithm using the first buffer 108, as described in FIGS. 4 and 9. The circuitry 202 may identify the second hand sign 804 as "open palm" in the first image frame based on the output of the image classifier 112b. The circuitry 202 may be further configured to determine pixel information associated with the first image frame.

At time T2, the circuitry 202 may receive the second image frame of the plurality of consecutive image frames. The circuitry 202 may identify the second hand sign 804 as "open palm" in the second image frame based on the output of the image classifier 112b. The circuitry 202 may be further configured to determine pixel information associated with the second image frame. The motion tracker 810 may be configured to estimate a first motion vector based on first pixel difference information associated with the first image frame and the second image frame. The first pixel difference information may be determined based on a difference between the pixel information associated with the first image frame and the pixel information associated with the second image frame. The motion tracker 810 may be configured to determine a first position of the second hand sign 804 based on the first motion vector.

At time T3, the circuitry 202 may receive the third image frame of the plurality of consecutive image frames. The circuitry 202 may identify the second hand sign 804 as "open palm" in the third image frame based on the output of the image classifier 112b. The circuitry 202 may be further configured to determine pixel information associated with the third image frame. The motion tracker 810 may be configured to estimate a second motion vector based on second pixel difference information associated with the second image frame and the third image frame. The second pixel difference information may be determined based on a difference between the pixel information associated with the second image frame and the pixel information associated with the third image frame. The motion tracker 810 may be further configured to determine a second position of the second hand sign 804 based on the second motion vector.

The motion tracker 810 may estimate the direction of the motion of the second hand sign 804 based on the first position and the second position at different time instants. The motion tracker 810 may estimate the direction of the motion of the second hand sign 804 based on movement of the second hand sign 804 across the quadrants. At the end of time T3, the circuitry 202 may determine the fourth gesture 806 based on the estimated direction of the motion of the second hand sign 804. The circuitry 202 may determine the fourth gesture 806 as "swipe down" based on the look-up table (Table 1).

Figure 9:
FIG. 9 is a diagram that illustrates an exemplary scenario for determination of a gesture based on a noise suppression algorithm using a strength of a signal corresponding to recognized hand sign, in accordance with an embodiment of the disclosure.
Figure 9:
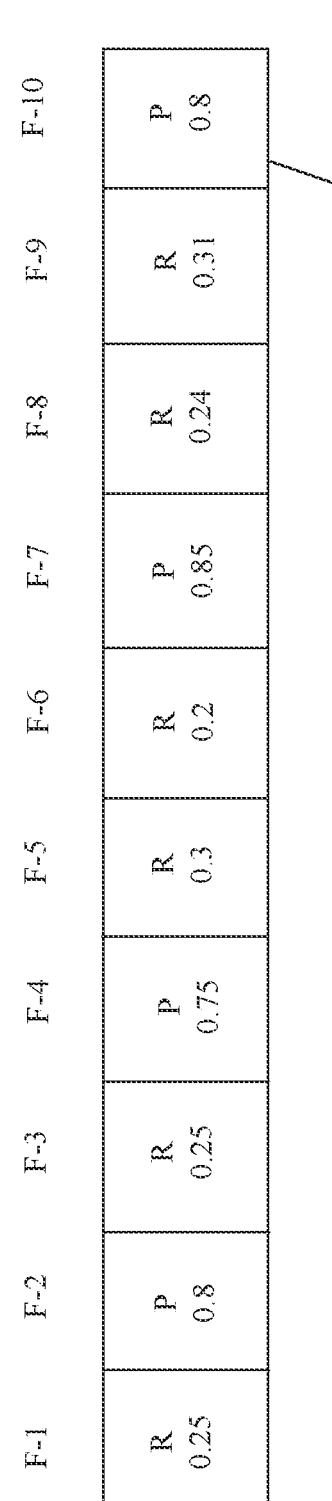
Figure 9:
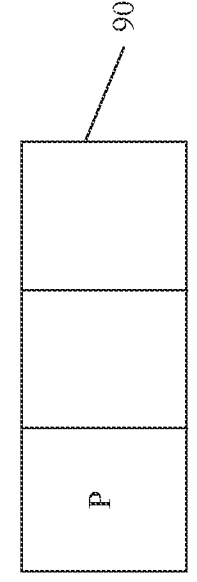

FIG. 9 is a diagram that illustrates an exemplary scenario for determination of a gesture based on a noise suppression algorithm using a strength of a signal corresponding to recognized hand sign, in accordance with an embodiment of the disclosure. FIG. 9 is explained in conjunction with elements from FIGS. 1-8. With reference to FIG. 9, there is shown an exemplary scenario 900. In the exemplary scenario 900, there is shown a first buffer 902 and a second buffer 904. The structure and functionality of the first buffer 902 is similar to the structure and functionality of the first buffer 108 (shown in FIG. 1) and the first buffer 401 (shown in FIG. 4). The structure and functionality of the second buffer 904 is similar to the structure and functionality of the second buffer 110 (shown in FIG. 1) and the second buffer 402 (shown in FIG. 4). In the exemplary scenario 400, there is shown the statuses of the first buffer 902 and the second buffer 904 at a specific time instant. The noise suppression algorithm described in the exemplary scenario 900 is a modification of the noise suppression algorithm described in the exemplary scenario 400. The modified noise suppression algorithm is configurable based on a target available memory of the electronic device 102 and a frame rate of image capture by the image capture device (e.g. set of sensors 210). The memory allocated for the first buffer 902 is configured to accommodate "n" seconds worth of video based on the available memory in the hardware and the frame rate at which the electronic device 102 is capable of running.

In an example, the first buffer 902 may include 10 blocks corresponding to a first length. The first buffer 902 may store either a plurality of consecutive image frames (e.g. 10 image frames) or frame numbers of the plurality of consecutive image frames at the specific time instant. Each block of the 10 blocks of the first buffer 902 may store either an image frame or a respective frame number of the image frame. The circuitry 202 may apply the neural network model 112 to recognize a hand sign in each image frame. For example, the neural network model 112 may output the class label, such as "rock" (R) and "paper" (P) for each image frame of the 10 consecutive image frames. In addition to the class label, the neural network model 112 may output a confidence score of prediction for each recognized hand sign. For example, the neural network model 112 may output the confidence scores of pred(1), pred(3), pred(5), pred(6), pred(8), and pred(9) for the recognition of the rock (R) hand sign in image frames F-1, F-3, F-5, F-6, F-8, and F-9, respectively. The neural network model 112 may output the confidence scores of pred(2), pred(4), pred(7), and pred(10) for the recognition of the paper (P) hand sign in image frames F-2, F-4, F-7, and F-10, respectively. In an embodiment, the circuitry 202 may store the class labels and the confidence scores associated with the image frames F-1 to F-10 in the first buffer 902. The confidence score corresponding to an image frame of the 10 consecutive image frames may be generalized as "pred(I) for rock" or "pred(I) for paper", where "I" is any value between 1 and 10.

The circuitry 202 may be configured to determine a probability value corresponding to the recognition of the hand sign in each of the plurality of consecutive image frames in the first buffer 902. The probability value corresponding to an image frame may include the individual probability of prediction within the first buffer 902, and may contribute a weightage to the overall prediction. For example, the probability value may indicate the probability that the recognized hand sign is "rock", the probability that the recognized hand sign is "paper", or the probability that the recognized hand sign is "scissors". The probability value corresponding to an image frame of the 10 consecutive image frames may be generalized as "prob(I) for rock" or "prob(I) for paper", where T may be any value between 1 and 10.

The circuitry 202 may be configured to select a hand sign to be stored in a block of the second buffer 904 for the determination of a hand gesture. In accordance with an embodiment, the selection may be performed based on equation 1:

$$\text{argmax}\{f(s)\} \qquad 1$$

where $$f = \alpha * \sum_{i=1}^{buffer_{size}} \left[ \frac{pred(i) * prob(i)}{n} \right] + \beta * prob(i)$$

$\forall s \in S$, where s is a subset of signs, belonging to a superset of all signs S; $\alpha$ and $\beta$ are programmable parameters; and I may vary between 1 and 10 corresponding to the 10 slots of the first buffer 902. The buffer$_{size}$ is 10 as the first buffer 902 includes 10 blocks. The circuitry 202 may be configured to control the parameters $\alpha$ and $\beta$.

The circuitry 202 may determine "argmax{f(rock)}" corresponding to the hand sign "rock" based on the probability value "prob(I) for rock" and the confidence score of prediction "pred(I) for rock", where I is a value between 1 and 10, and "n" is 10. The circuitry 202 may determine argmax{f (paper)} corresponding to the hand sign "paper" based on the probability value "prob(I) for paper" and the confidence score of prediction "pred(I) for paper", where I is a value between 1 and 10, and "n" is 10. The circuitry 202 may determine a strength of a signal corresponding to each hand sign (e.g. rock and paper). In an embodiment, the circuitry 202 may store the class labels and the strengths of the signals associated with the image frames F-1 to F-10 in the first buffer 902, as shown in FIG. 9. The strength of the signal "R" corresponding to image frames F-1, F-3, F-5, F-6, F-8, and F-9 may be 0.258 based on equation 1 for $\alpha$ and $\beta$ set as 1. The strength of the signal "P" corresponding to image frames F-2, F-4, F-7, and F-10 may be 0.8 based on equation 1.

The circuitry 202 may select the hand sign ("rock", "paper", or "scissor") corresponding to the highest argmax{f (s)} to be stored in the second buffer 904 based on the comparison of the strengths. For example, the circuitry 202 may compare the first strength corresponding to the "paper" hand sign with a second strength corresponding to each of the plurality of hand signs (e.g. "rock" or "scissor") excluding the "paper" hand sign. The circuitry 202 may determine the hand sign recognized in image frames F-1 to F-10 to be "paper" (P) in a case where the first strength (e.g. 0.8) corresponding to the "paper" hand sign is greater than the second strength (0.258) corresponding to the "rock" hand sign. The circuitry 202 may determine a gesture corresponding to the "paper" hand sign.

The modified noise suppression algorithm described in the exemplary scenario 900 may behave as an outlier removal mechanism, and may act as a substitution for input augmentation of data. The outlier removal mechanism may effectively act as an ensemble of models to increase the confidence of the prediction. In the exemplary scenario 900, in addition to the frequency of occurrence of each hand sign within the first buffer 902, the circuitry 202 may consider the confidence score of prediction and the probability of prediction for the determination of the hand sign. The circuitry 202 may thereby suppress noise and improve the accuracy of the gesture recognition in real-time video based on the outlier removal mechanism of the exemplary scenario 900.

In accordance with an embodiment, the gesture recognition performed by the neural network model 112 may be employed in various use case scenarios. In an example, the gesture recognition may be employed for smart television control for controlling actions such as sound volume control, menu navigation, playback control, and so on. The association between various gestures and actions may be defined in the look-up table (Table 1). In another example, the gesture recognition may be employed for generation of captions by interpretation of a video of signer in accordance with American sign language (ASL) or British sign language (BSL), etc. In another example, the gesture recognition may be employed for operation of sensitive optical equipment, such as high-end microscopes, telescopes, etc. Such equipment may not have mechanical buttons since simple touch or press could disturb the optical setup of the equipment during operation. In another example, the neural network model 112 may be employed for tracking user operations at a factory to generate analytics and obtain insights on the amount of time spent by each worker, machine being operated by the worker, and operation being performed by the worker, etc.

FIG. 10 is a flowchart that illustrates exemplary operations for gesture recognition on resource-constrained devices, in accordance with an embodiment of the disclosure. FIG. 10 is explained in conjunction with elements from FIGS. 1-9. With reference to FIG. 10, there is shown a flowchart 1000. The operations from 1002 to 1012 may be implemented by any computing system, such as by the electronic device 102 of FIG. 1 or the circuitry 202 of FIG. 2. The operations may start at 1002 and may proceed to 1004.

At 1004, storage of a plurality of first consecutive image frames in the first buffer 108 may be controlled, where the plurality of first consecutive image frames may correspond to the first length. In at least one embodiment, the circuitry 202 may be configured to control the storage of the plurality of first consecutive image frames in the first buffer 108.

At 1006, a first hand sign of a plurality of hand signs may be recognized in a first subset of image frames of the plurality of first consecutive image frames. In at least one embodiment, the circuitry 202 may be configured to recognize the first hand sign of the plurality of hand signs in the first subset of image frames of the plurality of first consecutive image frames. The details of the recognition of a first hand sign of the plurality of hand signs in the first subset of image frames of the plurality of first consecutive image frames, are described, for example, in FIGS. 3, 4, 5, 6, 7, and 8.

At 1008, a determination may be made whether a ratio of a number of the first subset of image frames and the first length is one of equal to or greater than a threshold. In at least one embodiment, the circuitry 202 may be configured to determine whether the ratio of the number of the first subset of image frames and the first length is one of equal to or greater than the threshold. The details of the determination of whether the ratio of the number of the first subset of image frames and the first length is one of equal to or greater than the threshold, are described, for example, in FIGS. 3 and 4.

At 1010, storage of the recognized first hand sign in the second buffer 110 may be controlled based on the determination that the ratio is one of equal to or greater than the threshold. In at least one embodiment, the circuitry 202 may be configured to control the storage of the recognized first hand sign in the second buffer 110 based on the determination that the ratio is one of equal to or greater than the threshold. The details of control of the storage of the recognized first hand sign in the second buffer 110 based on the determination that the ratio is one of equal to or greater than the threshold, are described, for example, in FIGS. 3 and 4.

At 1012, a gesture corresponding to one or more hand signs of the plurality of hand signs stored in the second buffer 110 may be determined. In at least one embodiment, the circuitry 202 may be configured to determine the gesture corresponding to one or more of the plurality of hand signs stored in the second buffer 110. The plurality of hand signs may include the first hand sign. The plurality of hand signs may correspond to the second length. The details of determination of the gesture corresponding to one or more of the plurality of hand signs stored in the second buffer 110, are described, for example, in FIGS. 3, 4, 5, 6, 7, and 8. Control may pass to end.

Although the flowchart 1000 is illustrated as discrete operations, such as 1004, 1006, 1008, 1010, and 1012, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include control of storage of a plurality of first consecutive image frames in the first buffer 108, wherein the plurality of first consecutive image frames corresponds to the first length. The operations may further include recognition of a first hand sign of a plurality of hand signs in a first subset of image frames of the plurality of first consecutive image frames. The operations may further include determination of whether a ratio of a number of the first subset of image frames and the first length is one of equal to or greater than a threshold. The operations may further include control of storage of the recognized first hand sign in the second buffer 110 based on the determination that the ratio is one of equal to or greater than the threshold. The operations may further include determination of a gesture corresponding to one or more hand signs of the plurality of hand signs stored in the second buffer 110. The plurality of hand signs may include the first hand sign. The plurality of hand signs may correspond to the second length.

Exemplary aspects of the disclosure may include an electronic device (such as the electronic device 102 of FIG. 1) that may include circuitry (such as the circuitry 202). The electronic device 102 may further include memory (such as the memory 204 of FIG. 2). The memory 204 may include the first buffer 108 of the first length and the second buffer 110 of the second length. The circuitry 202 may be configured to storage of a plurality of first consecutive image frames in the first buffer 108, where the plurality of first consecutive image frames may correspond to the first length. The circuitry 202 may be further configured to recognize a first hand sign of a plurality of hand signs in a first subset of image frames of the plurality of first consecutive image frames. The circuitry 202 may be further configured to determine whether a ratio of a number of the first subset of image frames and the first length is one of equal to or greater than a threshold. The circuitry 202 may be further configured to control storage of the recognized first hand sign in the second buffer 110 based on the determination that the ratio is one of equal to or greater than the threshold. The circuitry 202 may be further configured to determine a gesture corresponding to one or more hand signs of the plurality of hand signs stored in the second buffer 110, where the plurality of hand signs may include the first hand sign and the plurality of hand signs may correspond to the second length.

In accordance with an embodiment, the circuitry 202 may be further configured to discard the recognized first hand sign based on the determination that the ratio is less than the threshold. The plurality of first consecutive image frames may include a second subset of image frames, different from the first subset of image frames, that corresponds to one of a transition noise or an unrecognized class.

In accordance with an embodiment, the circuitry 202 may be further configured to control storage of a plurality of second consecutive image frames in the first buffer 108. The plurality of second consecutive image frames may be stored in the first buffer 108 subsequent to the plurality of first consecutive image frames. The circuitry 202 may be further configured to recognize a second hand sign of the plurality of hand signs in the first subset of image frames of the plurality of second consecutive image frames. The circuitry 202 may be further configured to determine whether the ratio of the number of the first subset of image frames corresponding to the second hand sign and the first length is one of equal to or greater than the threshold. The circuitry 202 may be further configured to control storage of the recognized second hand sign in the second buffer 110 based on the determination that the ratio is one of equal to or greater than the threshold.

In accordance with an embodiment, the circuitry 202 may be further configured to receive the plurality of first consecutive image frames from an image capture device. The circuitry 202 may be further configured to set the first length of the first buffer 108 based on a frame rate of the image capture device.

In accordance with an embodiment, the circuitry 202 may be further configured to set the second length of the second buffer 110 based on one of a type of the gesture or a number of the plurality of hand signs corresponding to the gesture.

In accordance with an embodiment, the circuitry 202 may be further configured to apply a first neural network model (e.g. object detector 112a) to detect an object corresponding to the first hand sign in the first subset of image frames. A size of the first neural network model may satisfy a memory constraint associated with the electronic device 102. The first neural network model may trained on a training dataset to detect the object and classify the detected object. The training dataset may include a set of objects.

In accordance with an embodiment, the circuitry 202 may be further configured to receive a plurality of image frames, where the plurality of image frames may include the plurality of first consecutive image frames. The circuitry 202 may be further configured to determine a bounding box that encloses the detected object in each image frame of the plurality of image frames. The bounding box may correspond to a set of coordinates in a respective image frame of the plurality of image frames. The circuitry 202 may be further configured to track the bounding box across a threshold number of image frames of the plurality of image frames to estimate a motion of the detected object.

In accordance with an embodiment, the circuitry 202 may be further configured to set one of a plurality of quadrants or a plurality of grids associated with each image frame of the plurality of image frames. The circuitry 202 may be further configured to track the motion of the detected object across one of the plurality of quadrants or the plurality of grids. The circuitry 202 may be further configured to determine the gesture based on the tracked motion of the detected object.

In accordance with an embodiment, the circuitry 202 may be further configured to apply a second neural network model (e.g. image classifier 112b) for execution of image classification on the plurality of first consecutive image frames. The size of the second neural network model may satisfy a memory constraint associated with the electronic device 102. The second neural network model may trained on a training dataset to identify the first hand sign. The training dataset may include a set of hand signs.

In accordance with an embodiment, the circuitry 202 may be further configured to receive a plurality of image frames, where the plurality of image frames may include the plurality of first consecutive image frames. The circuitry 202 may be further configured to estimate a first motion vector of the first hand sign based on first pixel difference information associated with a first image frame and a second image frame of the plurality of image frames. The circuitry 202 may be further configured to determine a first position of the first hand sign based on the first motion vector. The circuitry 202 may be further configured to estimate a second motion vector based on second pixel difference information associated with the second image frame and a third image frame of the plurality of image frames. The circuitry 202 may be further configured to determine a second position of the first hand sign based on the second motion vector. The circuitry 202 may be further configured to estimate a direction of motion of the first hand sign across the plurality of first consecutive image frames based on the determined first position and the determined second position.

In accordance with an embodiment, the circuitry 202 may be configured to set one of a plurality of quadrants or a plurality of grids associated with each image frame of the plurality of image frames. The circuitry 202 may be further configured to track the motion of the first hand sign across the one of the plurality of quadrants or the plurality of grids based on the estimated direction of the motion. The circuitry 202 may be further configured to determine the gesture based on the tracked motion of the first hand sign.

In accordance with an embodiment, the circuitry 202 may be configured to determine a probability value corresponding to the recognition of the first hand sign in each of the plurality of first consecutive image frames in the first buffer 108. The circuitry 202 may determine a confidence score corresponding to the recognition of the first hand sign in each of the plurality of first consecutive image frames. The circuitry 202 determine a first strength corresponding to the first hand sign based on the probability value corresponding to the first hand sign and the confidence score. The circuitry 202 may compare the first strength corresponding to the first hand sign with a second strength corresponding to each of the plurality of hand signs excluding the first hand sign. The circuitry 202 may determine the gesture corresponding to the first hand sign in a case where the first strength is greater than the second strength.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
   a memory comprising a first buffer of a first length and a second buffer of a second length; and
   circuitry configured to:
   receive a plurality of first consecutive image frames from an image capture device;
   set the first length of the first buffer based on a frame rate of the image capture device, wherein the received plurality of first consecutive image frames is associated with the frame rate of the image capture device;
   control storage of the received plurality of first consecutive image frames in the first buffer, wherein the received plurality of first consecutive image frames corresponds to the first length;
   recognize a first hand sign of a plurality of hand signs in a first subset of image frames of the received plurality of first consecutive image frames;
   determine a first ratio of a number of the first subset of image frames and the first length is one of:
   equal to or greater than a threshold, or
   less than the threshold;
   control storage of the recognized first hand sign in the second buffer based on the determination that the first ratio is equal to or greater than the threshold; and
   determine a gesture corresponding to at least one hand sign of the plurality of hand signs, wherein the at least one hand sign is stored in the second buffer, the at least one hand sign includes the recognized first hand sign, and the plurality of hand signs corresponds to the second length.

2. The electronic device according to claim 1, wherein the circuitry is further configured to discard the recognized first hand sign based on the determination that the first ratio is less than the threshold, and the plurality of first consecutive image frames comprises a second subset of image frames, different from the first subset of image frames, that corresponds to one of a transition noise or an unrecognized class.

3. The electronic device according to claim 1, wherein the circuitry is further configured to:

control storage of a plurality of second consecutive image frames in the first buffer, wherein the plurality of second consecutive image frames is stored in the first buffer subsequent to the plurality of first consecutive image frames;

recognize a second hand sign of the plurality of hand signs in a second subset of image frames of the plurality of second consecutive image frames;

determine a second ratio of a number of the second subset of image frames and the first length is equal to or greater than the threshold;

control storage of the recognized second hand sign in the second buffer based on the determination that the second ratio is equal to or greater than the threshold; and determine the gesture corresponding to at least two hand signs of the plurality of hand signs, wherein the at least two hand signs are stored in the second buffer, and the at least two hand signs include the recognized second hand sign.

4. The electronic device according to claim 1, wherein the circuitry is further configured to set the second length of the second buffer based on one of a type of the gesture or a number of the plurality of hand signs corresponding to the gesture.

5. The electronic device according to claim 1, wherein the circuitry is further configured to apply a first neural network model to detect an object corresponding to the first hand sign in the first subset of image frames, a size of the first neural network model satisfies a memory constraint associated with the electronic device, the first neural network model is trained on a training dataset to detect the object and classify the detected object, and the training dataset includes a set of objects including the detected object.

6. The electronic device according to claim 5, wherein the circuitry is further configured to:

receive a plurality of image frames, wherein the plurality of image frames includes the plurality of first consecutive image frames;

determine a bounding box that encloses the detected object in each image frame of the plurality of image frames, wherein the bounding box corresponds to a set of coordinates in a respective image frame of the plurality of image frames; and track the determined bounding box across a threshold number of image frames of the plurality of image frames to estimate a motion of the detected object.

7. The electronic device according to claim 6, wherein the circuitry is further configured to:

set one of:

a plurality of quadrants associated with the each image frame, or a plurality of grids associated with the each image frame;

track the motion of the detected object across one of the plurality of quadrants or the plurality of grids; and determine the gesture based on the tracked motion of the detected object.

8. The electronic device according to claim 1, wherein the circuitry is further configured to apply a second neural network model for execution of image classification on the received plurality of first consecutive image frames, a size of the second neural network model satisfies a memory constraint associated with the electronic device, the second neural network model is trained on a training dataset to recognize the first hand sign, and the training dataset includes a set of hand signs including the plurality of hand signs.

9. The electronic device according to claim 8, wherein the circuitry is further configured to:

receive a plurality of image frames, wherein the received plurality of image frames includes the plurality of first consecutive image frames;

estimate a first motion vector of the first hand sign, based on first pixel difference information associated with each of a first image frame of the received plurality of image frames and a second image frame of the received plurality of image frames;

determine a first position of the first hand sign based on the estimated first motion vector;

estimate a second motion vector, based on second pixel difference information associated with each of the second image frame and a third image frame of the received plurality of image frames;

determine a second position of the first hand sign based on the estimated second motion vector; and estimate a direction of a motion of the first hand sign across the plurality of first consecutive image frames based on the determined first position and the determined second position.

10. The electronic device according to claim 9, wherein the circuitry is further configured to:

set one of:

a plurality of quadrants associated with each image frame of the plurality of image frames, or a plurality of grids associated with the each image frame;

track the motion of the first hand sign across one of the plurality of quadrants or the plurality of grids based on the estimated direction of the motion of the first hand sign; and determine the gesture based on the tracked motion of the first hand sign.

11. The electronic device according to claim 1, wherein the circuitry is further configured to:

determine a probability value in the first buffer, wherein the probability value corresponds to the recognition of the first hand sign in each image frame of the plurality of first consecutive image frames;

determine a confidence score corresponding to the recognition of the first hand sign in the each image frame;

determine a first strength corresponding to the first hand sign based on the determined probability value and the determined confidence score;

compare the determined first strength corresponding to the first hand sign with a second strength corresponding to each hand sign of the plurality of hand signs excluding the first hand sign; and determine the gesture corresponding to the first hand sign, based on the determined first strength is greater than the second strength.

12. A method, comprising:

receiving a plurality of first consecutive image frames from an image capture device;

setting a first length of a first buffer based on a frame rate of the image capture device, wherein the received plurality of first consecutive image frames is associated with the frame rate of the image capture device;

controlling storage of the received plurality of first consecutive image frames in the first buffer of a memory of an electronic device, wherein the memory comprises a second buffer of a second length, and the received plurality of first consecutive image frames corresponds to the first length;

recognizing a first hand sign of a plurality of hand signs in a first subset of image frames of the received plurality of first consecutive image frames;

determining a first ratio of a number of the first subset of image frames and the first length is one of:

equal to or greater than a threshold, or less than the threshold;

controlling storage of the recognized first hand sign in the second buffer based on the determination that the first ratio is equal to or greater than the threshold; and determining a gesture corresponding to at least one hand sign of the plurality of hand signs, wherein the at least one hand sign is stored in the second buffer, the at least one hand sign includes the recognized first hand sign, and the plurality of hand signs corresponds to the second length.

13. The method according to claim 12, further comprising discarding the recognized first hand sign based on the determination that the first ratio is less than the threshold, wherein the plurality of first consecutive image frames comprises a second subset of image frames, different from the first subset of image frames, that corresponds to one of a transition noise or an unrecognized class.

14. The method according to claim 12, further comprising:

controlling storage of a plurality of second consecutive image frames in the first buffer, wherein the plurality of second consecutive image frames is stored in the first buffer subsequent to the plurality of first consecutive image frames;

recognizing a second hand sign of the plurality of hand signs in a second subset of image frames of the plurality of second consecutive image frames;

determining a second ratio of a number of the second subset of image frames and the first length is equal to or greater than the threshold;

controlling storage of the recognized second hand sign in the second buffer based on the determination that the second ratio is equal to or greater than the threshold; and determining the gesture corresponding to at least two hand signs of the plurality of hand signs, wherein the at least two hand signs are stored in the second buffer, and the at least two hand signs include the recognized second hand sign.

15. The method according to claim 12, further comprising applying a first neural network model to detect an object corresponding to the first hand sign in the first subset of image frames, wherein the first neural network model is trained on a training dataset to detect the object and classify the detected object, a size of the first neural network model satisfies a memory constraint associated with the electronic device, and the training dataset includes a set of objects including the detected object.

16. The method according to claim 15, further comprising:

receiving a plurality of image frames, wherein the plurality of image frames includes the plurality of first consecutive image frames;

determining a bounding box that encloses the detected object in each image frame of the plurality of image frames, wherein the bounding box corresponds to a set of coordinates in a respective image frame of the plurality of image frames; and tracking the determined bounding box across a threshold number of image frames of the plurality of image frames to estimate a motion of the detected object.

17. The method according to claim 12, further comprising applying a second neural network model for execution of image classification on the received plurality of first consecutive image frames, wherein the second neural network model is trained on a training dataset to recognize the first hand sign, a size of the second neural network model satisfies a memory constraint associated with the electronic device, and the training dataset includes a set of hand signs including the plurality of hand signs.

18. A non-transitory computer-readable medium having stored thereon computer-executable instructions which, when executed by a processor of an electronic device, cause the processor to execute operations, the operations comprising:

receiving a plurality of first consecutive image frames from an image capture device;

setting a first length of a first buffer based on a frame rate of the image capture device, wherein the received plurality of first consecutive image frames is associated with the frame rate of the image capture device;

controlling storage of the received plurality of first consecutive image frames in the first buffer of a memory of the electronic device, wherein the memory comprises a second buffer of a second length, and the received plurality of first consecutive image frames corresponds to the first length;

recognizing a first hand sign of a plurality of hand signs in a first subset of image frames of the received plurality of first consecutive image frames;

determining a ratio of a number of the first subset of image frames and the first length is one of:

equal to or greater than a threshold, or less than the threshold;

controlling storage of the recognized first hand sign in the
second buffer based on the determination that the ratio
is equal to or greater than the threshold; and determining a gesture corresponding to at least one hand
sign of the plurality of hand signs, wherein
the at least one hand sign is stored in the second buffer,
the at least one hand sign includes the recognized first
hand sign, and
the plurality of hand signs corresponds to the second
length.

\* \* \* \* \*